(12) United States Patent
Gooneratne et al.

(10) Patent No.: US 11,434,726 B2
(45) Date of Patent: *Sep. 6, 2022

(54) SELF-WINDING POWER GENERATING SYSTEMS AND METHODS FOR DOWNHOLE ENVIRONMENTS

(71) Applicant: Saudi Arabian Oil Company, Dhahran (SA)

(72) Inventors: Chinthaka Pasan Gooneratne, Dhahran (SA); Bodong Li, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 5 days.

This patent is subject to a terminal disclaimer.

(21) Appl. No.: 16/897,557

(22) Filed: Jun. 10, 2020

(65) Prior Publication Data

US 2020/0300063 A1 Sep. 24, 2020

Related U.S. Application Data

(63) Continuation of application No. 16/170,296, filed on Oct. 25, 2018, now Pat. No. 10,808,504.

(51) Int. Cl.
*E21B 41/00* (2006.01)
*E21B 47/13* (2012.01)
(Continued)

(52) U.S. Cl.
CPC .......... *E21B 41/0085* (2013.01); *E21B 47/13* (2020.05); *F03G 1/02* (2013.01);
(Continued)

(58) Field of Classification Search
CPC ...... E21B 41/0085; E21B 47/13; E21B 47/07; E21B 19/16; E21B 47/06; E21B 49/00;
(Continued)

(56) References Cited

U.S. PATENT DOCUMENTS

| 2,829,443 A | 4/1958 | Abs |
| 4,664,531 A | 5/1987 | King |
| 4,990,813 A | 2/1991 | Paramo |
| 5,553,678 A | 9/1996 | Barr et al. |
| 7,075,454 B2 * | 7/2006 | Hirsch .................. E21B 17/028 340/854.6 |

(Continued)

FOREIGN PATENT DOCUMENTS

WO 2017015004 A1 1/2017

OTHER PUBLICATIONS

International Search Report and Written Opinion for International Application No. PCT/US2019/057783 (SA5875) dated Jan. 31, 2020; pp. 1-13.

*Primary Examiner* — Nicole Coy
(74) *Attorney, Agent, or Firm* — Bracewell LLP; Constance G. Rhebergen; Linda L. Morgan

(57) ABSTRACT

Self-winding power generating device, system, and method are disclosed. The device includes a mechanical winding knob for receiving mechanical energy from a downhole environment, a gear train including a plurality of gears engaged with each other, wherein a first gear in the gear train is operatively connected to the mechanical winding knob, and configured to receive mechanical energy from the mechanical winding knob and transfer the mechanical energy to a second gear in the gear train, a spiral spring attached to one of the gears in the gear train, the spiral spring configured to self-wind and store the mechanical energy upon receiving the mechanical energy from the first gear, and a power generation unit configured to receive the mechanical energy from a last of the plurality of gears and convert the mechanical energy into electrical energy.

47 Claims, 18 Drawing Sheets

(51) Int. Cl.
*F03G 1/02* (2006.01)
*F16H 1/20* (2006.01)
*F16H 21/36* (2006.01)
*F16H 21/38* (2006.01)
*F16H 33/02* (2006.01)
*H02N 2/18* (2006.01)
*E21B 47/07* (2012.01)
*E21B 19/16* (2006.01)
*E21B 47/06* (2012.01)
*E21B 49/00* (2006.01)

(52) U.S. Cl.
CPC ............... *F16H 1/20* (2013.01); *F16H 21/36* (2013.01); *F16H 21/38* (2013.01); *F16H 33/02* (2013.01); *H02N 2/181* (2013.01); *E21B 19/16* (2013.01); *E21B 47/06* (2013.01); *E21B 47/07* (2020.05); *E21B 49/00* (2013.01)

(58) Field of Classification Search
CPC .............. F03G 1/02; F16H 1/20; F16H 21/36; F16H 21/38; F16H 33/02; H02N 2/181
See application file for complete search history.

(56) References Cited

U.S. PATENT DOCUMENTS

| | | |
|---|---|---|
| 7,109,594 B2 | 9/2006 | Liao |
| 7,127,886 B2 | 10/2006 | Fielder |
| 7,948,108 B2 | 5/2011 | Peralta |
| 8,148,832 B2 | 4/2012 | Cripps |
| 8,179,278 B2 | 5/2012 | Shakra et al. |
| 8,519,677 B2 | 8/2013 | Post et al. |
| 8,536,731 B2 | 9/2013 | Biester et al. |
| 10,072,495 B1 | 9/2018 | Gooneratne et al. |
| 2004/0257241 A1 | 12/2004 | Menger |
| 2006/0016606 A1 | 1/2006 | Tubel et al. |
| 2010/0327681 A1 | 12/2010 | Perry |
| 2014/0084748 A1 | 3/2014 | Wang et al. |
| 2014/0174733 A1 | 6/2014 | Gadot et al. |
| 2014/0246950 A1 | 9/2014 | Wang et al. |
| 2014/0252914 A1 | 9/2014 | Post |
| 2014/0300248 A1 | 10/2014 | Wang et al. |
| 2014/0338458 A1 | 11/2014 | Wang et al. |
| 2015/0108767 A1 | 4/2015 | Winslow |
| 2016/0084043 A1 | 3/2016 | Cobb et al. |
| 2016/0102529 A1 | 4/2016 | Disantis et al. |
| 2017/0110988 A1 | 4/2017 | Izumi et al. |
| 2017/0271688 A1 | 9/2017 | Shanfield et al. |

* cited by examiner

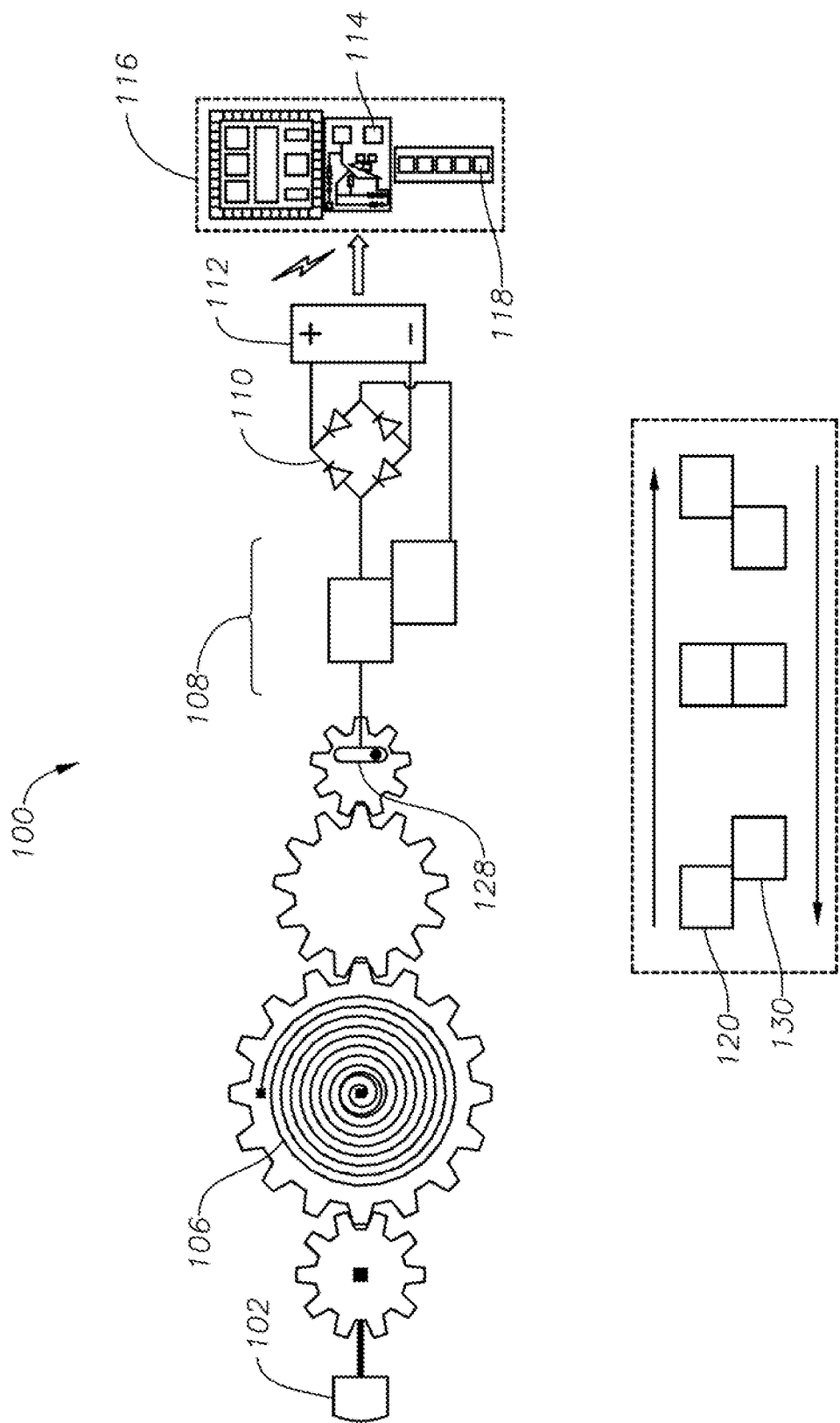

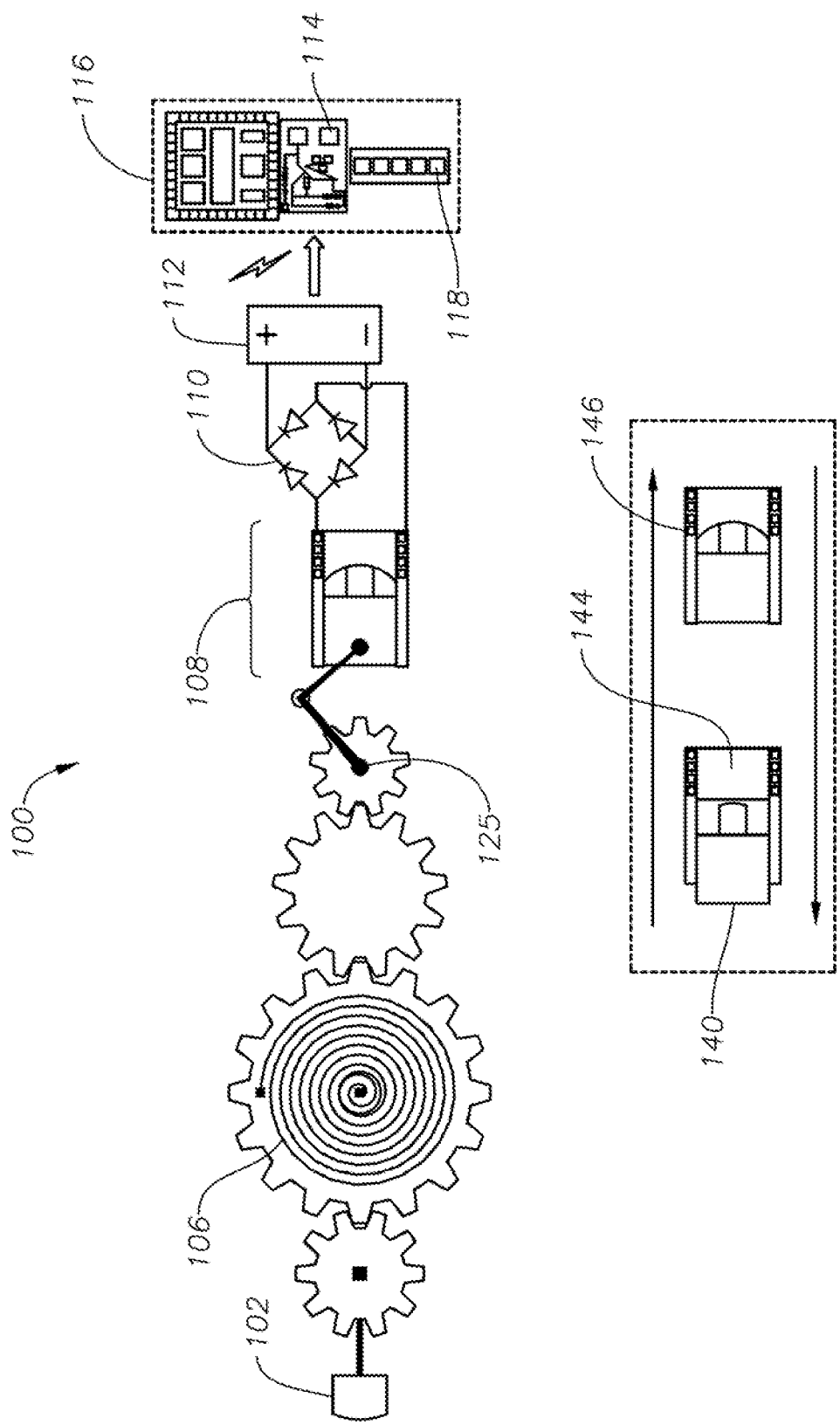

SELF-WINDING POWER GENERATING SYSTEMS AND METHODS FOR DOWNHOLE ENVIRONMENTS

RELATED APPLICATIONS

This application is a continuation of and claims priority to U.S. patent application Ser. No. 16/170,296 filed on Oct. 25, 2018 titled "SELF-WINDING POWER GENERATING SYSTEMS AND METHODS FOR DOWNHOLE ENVIRONMENTS," which is hereby incorporated herein by reference in its entirety.

BACKGROUND

Field

Embodiments of the present disclosure relate to systems and methods for wirelessly monitoring well conditions using self-winding power generating devices including a power generator that generates power based on friction between two materials of opposite polarity, or piezoelectricity, or magnetostriction.

Description of Related Art

Background

Logging tools such as MWD (measurement while drilling) and LWD (logging while drilling) play a critical role in drilling wells safely, accurately, and efficiently by providing directional data of the wellbore as well as acquiring information about the surrounding geological formations. These logging tools are run inside a wellbore either by wireline or as a sub in a drillstring assembly. Wireline is a costly process since the drilling assembly has to be pulled out of the wellbore first to run the wireline assembly. This also means that logging data cannot be obtained while drilling. There is also a risk of the wireline assembly getting stuck inside the hole along with all its expensive sensors, instrumentation thereby significantly adding to the cost of drilling a well. MWD and LWD on the other hand obtain downhole parameters while drilling and the data from these tools are transmitted to the surface by a technique called mud pulse telemetry. In mud pulse telemetry, the data is sent to the surface as pressure pulses and are decoded at the surface by pressure transducers. MWD/LWD are very expensive, bulky, and lengthy tools.

In wireline operations the power to the wireline sensors and instrumentation are provided by a wired power line that extends from the power source at the surface all the way down to the well depth. The power to MWD and LWD is provided by rechargeable lithium battery packs, turbines, or alternators. One of the drawbacks of lithium batteries is their cost. For example, they are significantly more expensive to manufacture than nickel cadmium batteries and this is even more pronounced when they have to be mass produced for various applications. In order to meet factory demand more fossil fuels might be required to produce batteries. Moreover, lithium batteries suffer from ageing, which depends on the number of charge-discharge cycles the battery has undergone. However, eventually batteries expire resulting in large volumes of contaminated waste. Therefore, the usage of lithium batteries not only has significant costs in their production life cycle but also has a negative impact on the environment. Mechanical failure rates of batteries are also generally high and can be expected to be higher downhole given the harsh environments they are exposed to. Turbines and alternators harness the kinetic energy of a fluid flow to generate electricity. Therefore, they can only generate electricity when there is a fluid flow inside a drillstring, and the power produced depends on the speed of the fluid flow. Heavy muds and lost circulation material in a drillstring for example can significantly reduce the speed of flow in a drillstring and might even block the pathway through the turbines and alternators.

In onshore wells the MWD/LWD tools are typically used in directional drilling but in offshore wells generally only MWD tools are used. Both MWD and LWD utilize batteries or turbines. Wireline logging operations are also used in both onshore and offshore. The current method of communication between MWD/LWD sensors downhole and the surface, mud pulse telemetry, is very slow, has low resolution, and haven't progressed at the same rate as the MWD/LWD sensors. Therefore, a faster data communication method than mud pulse telemetry is needed to fully utilize the higher resolution data that advanced sensors can obtain.

SUMMARY

Rewindable spiral springs have been used as an energy storage media for many decades and have applications in wind up watches, the automotive, military, and aerospace industries where the reversible (winding and unwinding) behavior of the spiral springs enable them to store and release energy repeatedly. Spiral springs made from super alloys such as Inconel have been used in high temperature, high pressure, and corrosive environments. Recently springs made out of carbon nanotubes (CNT) have garnered significant interest due to their high energy densities, low fatigue, and their ability to drive both quick-release devices that require a high spurt of power and slow-release systems. Similarly a lot of research is also being performed in the area of Graphene springs, which are strong and highly stretchable and responsive. These properties make springs an attractive option as an energy storage medium that can provide constant power to sensors and actuators when used in combination with smart materials and systems to convert kinetic energy created by the unwinding of the spring to electrical energy.

Accordingly, example embodiments relate to a self-winding power generating device with integrated sensors and a communication module that can be injected into wells to evaluate, characterize downhole in-situ environments as well as carry commanding signals to downhole equipment. The present disclosure illustrates how these devices provide clear advantages over current technologies such as wireline and MWD/LWD with respect to size, cost, sensitivity, power, mobility and potentially more downhole applications. Since the components are very small they require less power to operate, a significant advantage in downhole environments. A power generator based on in-situ downhole energy harvesting is designed to meet the lower power requirement of these devices. The device is self-powered since both mechanical and hydraulic energies are harvested when a device flows with the wellbore fluid and this energy can be used to power the sensors, actuators and the communication module.

One example embodiment is a self-winding power generation device including a mechanical winding knob for receiving mechanical energy from a downhole environment, a gear train including a plurality of gears engaged with each other, a spiral spring attached to one of the gears in the gear train, the spiral spring configured to self-wind and store the mechanical energy upon receiving the mechanical energy from a first gear, and a power generation unit configured to receive the mechanical energy from a last of the plurality of gears and convert the mechanical energy into electrical energy. The first gear in the gear train is operatively connected to the mechanical winding knob, and configured to receive mechanical energy from the mechanical winding knob and transfer the mechanical energy to a second gear in the gear train. The spiral spring is further configured to unwind and drive the gear train when there is insufficient transfer of mechanical energy from the first gear.

Another example embodiment is a system for monitoring well conditions. The system includes a plurality of self-winding power generation devices scaled down to be miniature mobile devices, which are dropped down a well at the surface and travel with the drilling fluid flow down the well, out of the bit, and then back up the annulus and casing all the way to the surface. Each of the plurality of self-winding power generation devices includes a mechanical winding knob for receiving mechanical energy from a downhole environment, a gear train including a plurality of gears engaged with each other, a spiral spring attached to one of the gears in the gear train, the spiral spring configured to self-wind and store the mechanical energy upon receiving the mechanical energy from a first gear, and a power generation unit configured to receive the mechanical energy from a last of the plurality of gears and convert the mechanical energy into electrical energy. The first gear in the gear train is operatively connected to the mechanical winding knob, and configured to receive mechanical energy from the mechanical winding knob and transfer the mechanical energy to a second gear in the gear train. The spiral spring is further configured to unwind and drive the gear train when there is insufficient transfer of mechanical energy from the first gear. The mobile devices can transfer data to a computer on the drilling surface.

Another example embodiment is a method for wirelessly monitoring well conditions. The method includes wirelessly connecting a plurality of self-winding power generating devices downhole to a computer on a drilling surface, each of the plurality of self-winding power generating devices including mechanical winding knob for receiving mechanical energy from a downhole environment, a gear train including a plurality of gears engaged with each other, a spiral spring attached to one of the gears in the gear train, the spiral spring configured to self-wind and store the mechanical energy upon receiving the mechanical energy from a first gear, and a power generation unit configured to receive the mechanical energy from a last of the plurality of gears and convert the mechanical energy into electrical energy. The first gear in the gear train is operatively connected to the mechanical winding knob, and configured to receive mechanical energy from the mechanical winding knob and transfer the mechanical energy to a second gear in the gear train. The spiral spring is further configured to unwind and drive the gear train when there is insufficient transfer of mechanical energy from the first gear.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the drawing figures are not necessarily drawn to scale. For example, the dimensions of some of the elements in the figures may be exaggerated relative to other elements to help improve understanding of example embodiments. Like reference numerals refer to like elements throughout the specification.

FIGS. 5A and 5B show a schematic of a high temperature, self-winding, downhole power generating device comprising a gear train with a scotch-yoke connected to a module generating power by friction between two materials of opposite polarities, sensors, microcontroller/microprocessor and a communications module, according to one or more example embodiments.

FIG. 9A shows a schematic of a high temperature, self-winding, downhole power generating device comprising a gear train with a slider-crank connected to a module generating power by utilizing magnetostrictive materials, sensors, microcontroller/microprocessor and a communications module, according to one or more example embodiments.

DETAILED DESCRIPTION

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. The term "high temperature" as referred to herein refers to temperatures above 125° C. unless otherwise noted.

Figure 1:
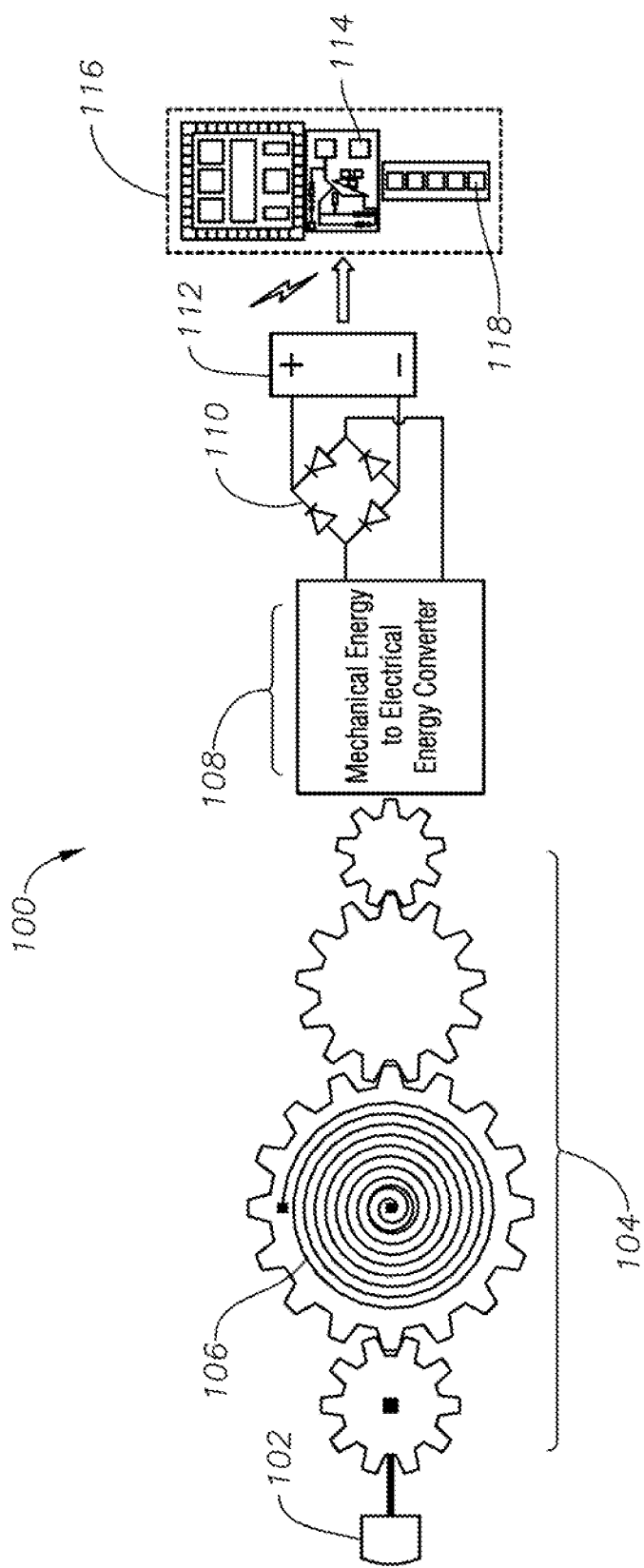
FIG. 1 is a schematic of a high temperature, self-winding, downhole power generating device comprising a gear train, power generation module, sensors, microcontroller/microprocessor and a communications module, according to one or more example embodiments.

Turning now to the figures, FIG. 1 illustrates a self-winding power generating (SWPG) device 100 including a mechanical winder 102 to receive mechanical energy from the downhole environment, a coiled spring 106 to store the mechanical energy, and a gear train 104 to control and transmit the mechanical energy to an electricity generation module 108. A bridge-rectifier 110 converts this alternating current to a direct current and stores it in the electrical energy storage 112, which then provides regulated power to any sensors or instrumentation that may be connected to the device. The device 100 may also include an electrical energy storage 112 such as a regular di-electric capacitor de-rated for use at high temperatures, a ceramic, an electrolytic or a super capacitor for storing the electrical energy. The device 100 may also include one or more sensors 118 connected to a microprocessor or microcontroller 114 for receiving the sensor data, and a transceiver 116 operatively coupled to the microcontroller for receiving and transmitting the sensor data. The microprocessor or microcontroller 114 may be configured to manage the power stored in the electrical energy storage 112 and the power used to power the one or more sensors 118. In one example embodiment, the electrical energy storage 112 can be removed from the system as long as there is automatic winding of the spiral spring 106, and the electrical energy harvested by the electricity generation module 108 can be fed directly into the power management circuit of the microcontroller 116. The SWPG device 100 is a lightweight device designed to be used in high temperature environments, and all the components of the SWPG device can tolerate high temperatures. The spiral spring 106 may be made from steel, super alloy, carbon nanotubes, graphene or any other material that exhibits similar high energy densities, low fatigue, and ability to drive both quick-release devices that require a high spurt of power and slow-release systems. The fully wound spiral spring 106 applies a torque to the barrel as it begins releasing this stored energy, which is then transmitted through the gear train 104. The gear train 104 includes different sized gears with different number of teeth depending on the speed at which the kinetic energy needs to be transferred to the electricity generation module 108. The gears in the gear train 104 can be made from materials that have high temperature resistance and strength such as thermoplastics, resins, polymers, carbon, steel, or any metal/alloy. One of the main functions of the spring 106 and the gear train 104 is to ensure motion is transferred to the electricity generating structure 108 in a constant, periodic way. For example, one method of achieving this is by including an escapement (not shown) in the gear train 104 to control the rate at which energy is released to trigger motion in the electricity generating structure 108. Once deployed downhole, the automatic rewinding of the spiral spring 106 may be achieved by harnessing motion of the drillstring assembly while rotating the drillstring or while drilling or by the motion of drilling fluid flow. Accordingly, FIG. 1 illustrates a self-winding power generating (SWPG) device 100 including a power generator 108, integrated sensors 118, microcontroller/microprocessor 114 and a communication module 116 that can be injected into wells to evaluate, characterize downhole environments as well as control downhole equipment. These devices have the ability to perform the same/similar functions as wireline logging and MWD/LWD tools but are smaller, more flexible, and more economical. Since the components are very small they require less power to operate, a significant advantage in downhole environments. The device is self-powered since both mechanical and hydraulic energies are harvested when a device flows with the mud and this energy can be used to power the sensors 118, microcontroller/microprocessor 114, and a communication module 116.

Figure 2:
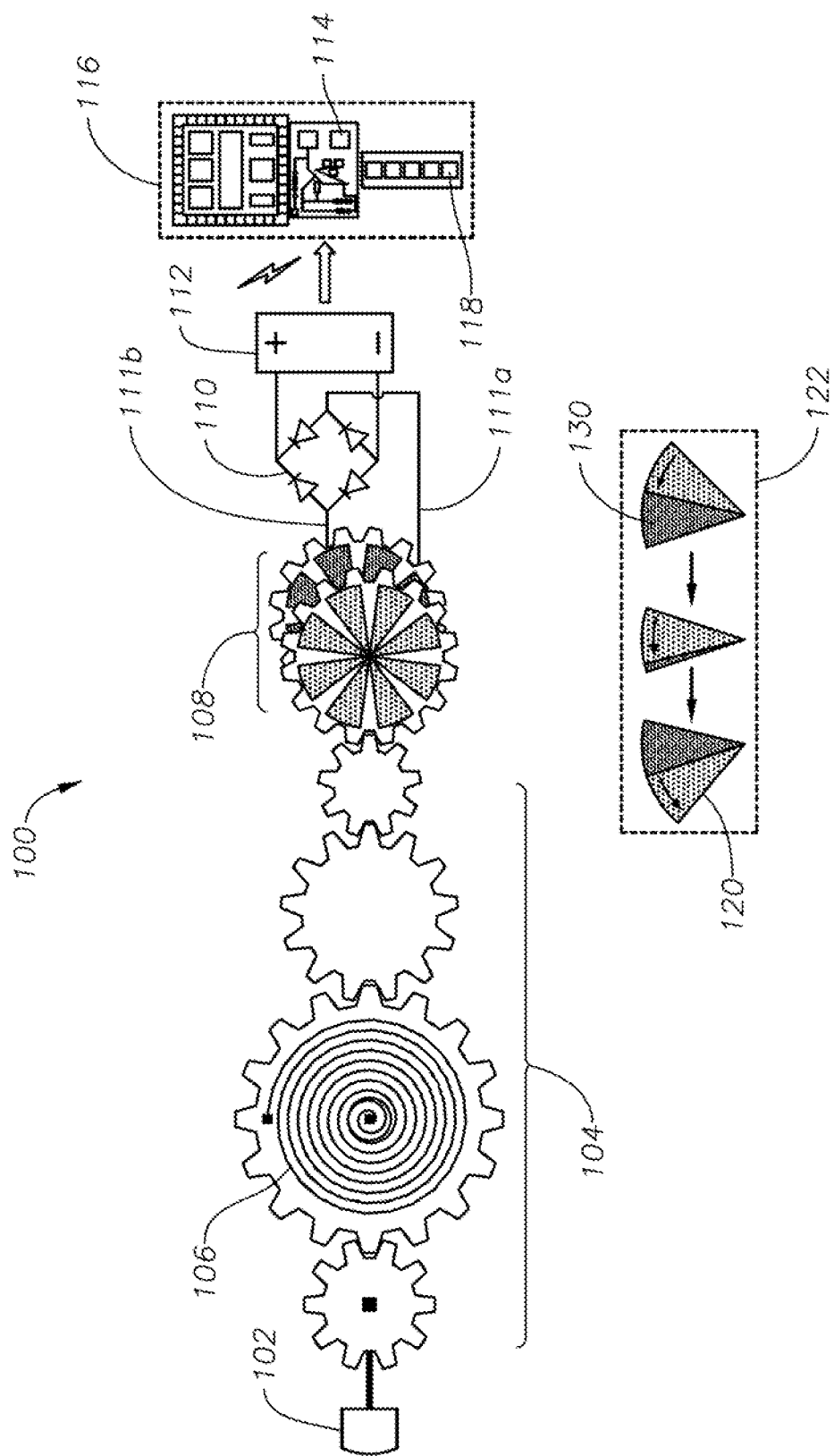
FIG. 2 is a schematic of a high temperature, self-winding, downhole power generating device comprising a gear train, a module generating power by friction between two materials of opposite polarities, sensors, microcontroller/microprocessor and a communications module, according to one or more example embodiments.

FIG. 2 illustrates another embodiment of the SWPG device 100 with two materials 120, 130 of opposing polarities for generating electricity in the power generation module 108. Material 120 and material 130 may be coated in arrays as shown in FIG. 2, and placed directly on top of each other so they slide past each other during rotation of material 120 while material 130 is kept fixed, as shown in box 122, for example. Material 130 could also rotate when material 120 is fixed or both materials 120 and 130 could rotate relative to each other. The sliding contact between material 120 and material 130 generates electricity since they are of opposite polarities. Materials 120 and 130 can be made of materials such as Polytetrafluoroethylene (PTFE), Polyethylene terephthalate (PET), Polydimethylacrylamide (PDMA), Polydimethylsiloxane (PDMS), Polyimide, Copper, Silver, Aluminum, Lead, Elastomer, Teflon, Kapton, Nylon or Polyester. However, they should be of opposite polarities to serve the intended purpose of power generation. These materials can tolerate high temperatures, are stable, and have negligible degradation due to sliding contact with each other over many cycles.

When material 120 comes in contact with material 130, charges move from one material to the other. Some materials have a tendency to gain electrons and some to lose electrons. If material 120 has a higher polarity than material 130, then electrons are injected from material 130 into material 120.

This results in oppositely charged surfaces. When these two materials are separated there is current flow, when a load is connected between the materials, due to the imbalance in charges between the two materials. The current flow continues until both the materials are at the same potential. When the materials move towards each other again there is a current flow again, but in the opposite direction. Therefore, this contact and separation motion of materials can be used to generate electricity. A plurality of electrodes 111a, 111b facilitate current flow to the bridge rectifier 110 where the generated electrical energy is converted from an alternating current to a direct current by the rectifier circuit employing diodes. The generated electricity can be stored so that it can be used as a regulated power source even when there is insufficient vibration or mud flow. The storage unit 112 can be either a di-electric capacitor for use at high temperatures, a ceramic, an electrolytic or a super capacitor. By storing the energy in a capacitor, power can be provided continuously to the sensors 118 and the communication module 116. The storage unit 112 provides power to the microprocessor/microcontroller 114, which performs the power management and control functions of the device. The microcontroller 114 is connected to a transceiver 116 and an antenna. The transceiver 116 employs low power wireless technologies such as low-power Wi-Fi, Bluetooth, Bluetooth Low Energy, ZigBee, etc. The antennas can be directional, omni-directional and point-to-point. They can also be planar antennas such as monopole, dipole, inverted, ring, spiral, meander and patch antennas.

Materials 120 and 130 in the power generator 108 are required to withstand high temperatures (>125° C.) and have good stability with little or no degradation in material properties after many cycles and they should not get damaged due to shock, vibration or high pressures. Some suitable materials are Polytetrafluoroethylene (PTFE), Polyethylene terephthalate (PET), Polydimethylacrylamide (PDMA), Polydimethylsiloxane (PDMS), Polyimide, Copper, Silver, Aluminum, Lead, Elastomer, Teflon, Kapton, Nylon or Polyester, or any other material that can cause static electricity, or any material with similar or better thermal, mechanical and chemical properties for downhole environments, which can also be deposited as thin films. Also, the materials should be relatively cheap if they are to be used in power generators to generate electricity for many transceivers. When choosing materials it is important to remember that they have opposite polarities or polarities as distant as possible from each other.

Figure 3:
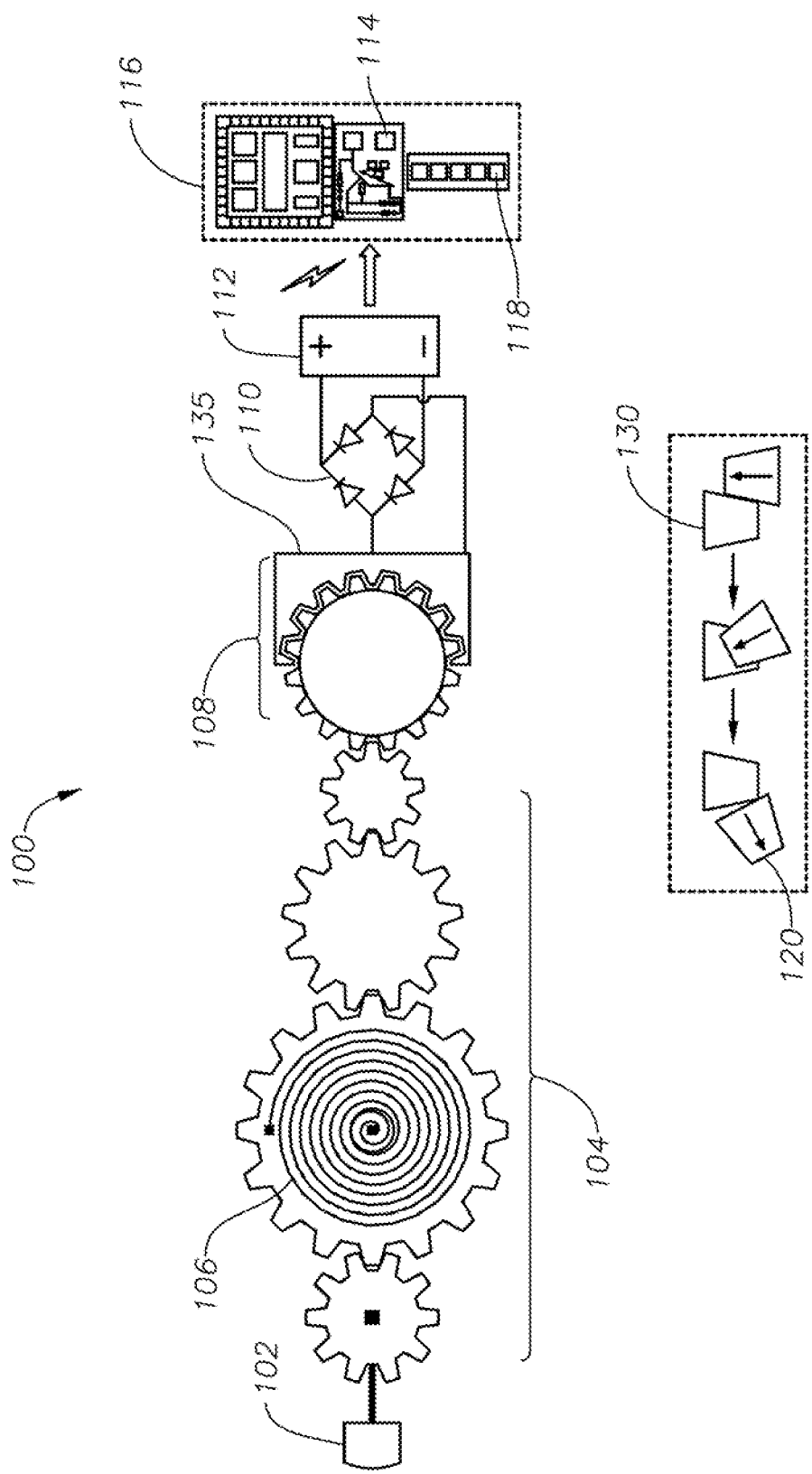
FIG. 3 is a schematic of a high temperature, self-winding, downhole power generating device comprising a gear train, a module generating power by friction between two materials of opposite polarities, sensors, microcontroller/microprocessor and a communications module, according to one or more example embodiments.

FIG. 3 illustrates another embodiment of SWPG device 100 where material 120 is coated on the teeth of the gear sliding past material 130. Material 130 can be part of a fixed structure 135, and the sliding contact between material 120 and material 130 generates electricity. The power consumption must be minimized and therefore, should be carefully controlled. The microprocessor/microcontroller unit 114 performs the power management in the device. It interprets and processes information stored in the memory and analyzes the data obtained from the sensors 118. The sensors 118, memory and the transceivers and antenna in the communication module 116 have its own level of power usage. The sensors 118 only require power when it has to sense data from the environment and store it in memory. It has low or no power consumption after this process and can go to 'sleep' until it has to obtain data again. If the sensor 118 is required to continuously obtain data it has to be 'active' continuously and the microcontroller/microprocessor 114 is required to obtain data at a high sample rate. Since this will rapidly drain power from the storage the sensors 118 are designed to be 'active' at certain periods of non-overlapping times. Sensors 118 can also be designed to be 'active' at certain depths, where depth can be measured by an accelerometer, magnetometer or a gyroscope. Similarly, the transceivers 116 are designed to transmit and receive data at pre-determined times or when triggered by an external signal. Moreover, since transceivers 116 require more energy than sensors 118 and the microcontroller/microprocessor unit 114 to transmit/receive data, only a sample of data after analysis by the microcontroller/microprocessor, rather than all the sensed data, could be transmitted/received to save power downhole. The antenna can be on-chip or detachable and is integrated with the transceiver to form a communication module 116. The transceiver 116 employs low power wireless technologies such as low-power Wi-Fi, Wi-Fi Direct, Bluetooth, Bluetooth Low Energy, ZigBee, etc.

Higher frequencies allow a better signal and a longer transmission distance. However, the system must be optimized since attenuation and power requirements are also higher at higher frequencies. The antennas can also be directional, omni-directional and point-to-point. They can also be planar antennas such as monopole, dipole, inverted, ring, spiral, meander and patch antennas. RFID tags can also be incorporated into each devices so that data obtained at the surface can be uniquely identified and linked to the correct device. Passive RFID tags do not require a power source but have low bandwidth and high failure rates in data transmission. Active tags can be used instead since each device has a power generator.

Multi-channel modules can be designed to optimize the space available in a device. For example, high temperature co-fired ceramic (HTCC) substrates of Alumina can used for the electronic boards. These substrates are generally plated with Cu, Ni and Au for soldering and wire-bonding. The circuit dies in these boards can be processed independently and assembled into a single device as a final step. The circuit boards can be interconnected with each other using ceramic single inline package headers on brazed pins (BeNi contacts). BeNi is commercially available and is a standard technology for high temperature packaging. HTCC packages have excellent mechanical rigidity, thermal dissipation and hermeticity, important features in harsh, high temperature applications. Silicon-on-insulator (SOI) technology can be utilized for active electronics in the system. Compared to bulk Si technology, SOI significantly reduces leakage currents and variations in device parameters, improves carrier mobility, electromigration between interconnects and dielectric breakdown strength. Silicon Carbide (SiC) based electronics has superior properties to silicon based electronics and is another candidate for harsh environment applications, which are thermally, mechanically and chemically aggressive. SiC has many polytypes but 6H and 4H (H=Hexagonal) are the two most commonly used polytypes. Silicon has a bandgap of 1.12 eV and loses its PN junction characteristics around 200-225° C. SiC on the other hand has a bandgap of greater than 3 eV and can tolerate temperatures up to 600° C. Compared with Si, SiC also has a higher melting point (1420° C. vs 2830° C.).

Figure 4A:
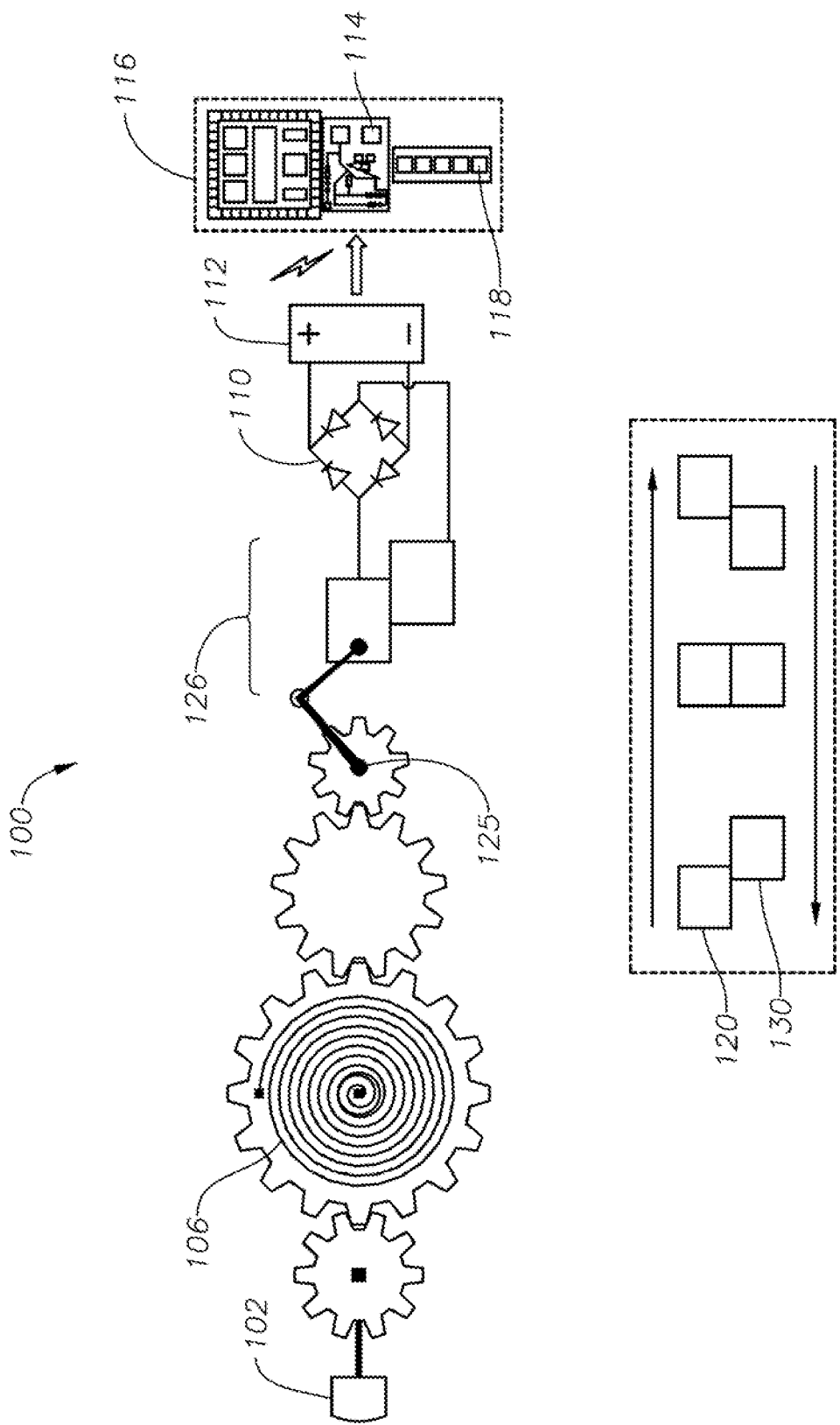
FIGS. 4A and 4B show a schematic of a high temperature, self-winding, downhole power generating device comprising a gear train with a slider-crank connected to a module generating power by friction between two materials of opposite polarities, sensors, microcontroller/microprocessor and a communications module, according to one or more example embodiments.

FIG. 4A illustrates another embodiment of SWPG device 100 where a gear with a slider-crank 125 is used to transform the rotational motion of the previous gear into translational motion. The circular motion of the crank 125 is converted into linear motion of a slider 126. The slider is connected to a rectangular object, for example material 120, which slides over another rectangular object, for example material 130, which is fixed. Since materials 120 and 130 are of opposite polarities, electricity is generated when material 120 slides over material 130 in a repeated fashion. Similarly in FIG. 4B, a rectangular object with an array of material 120 is slid inside a structure that has an array of material 130 on the top and bottom. When a strip of material 120 comes into contact with material 130 and then slides away from it, electricity is generated.

Figure 4B:
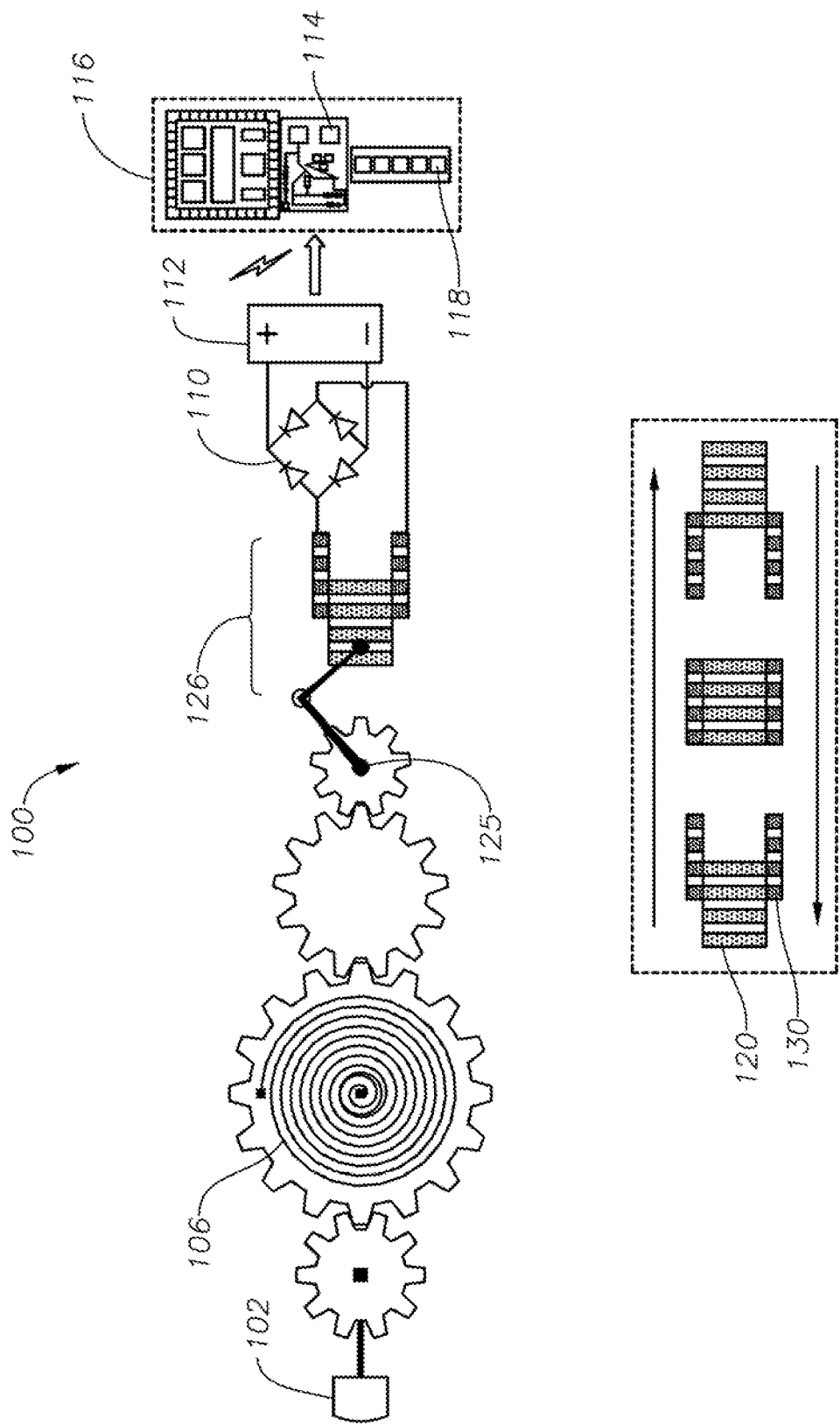
Figure 5B:
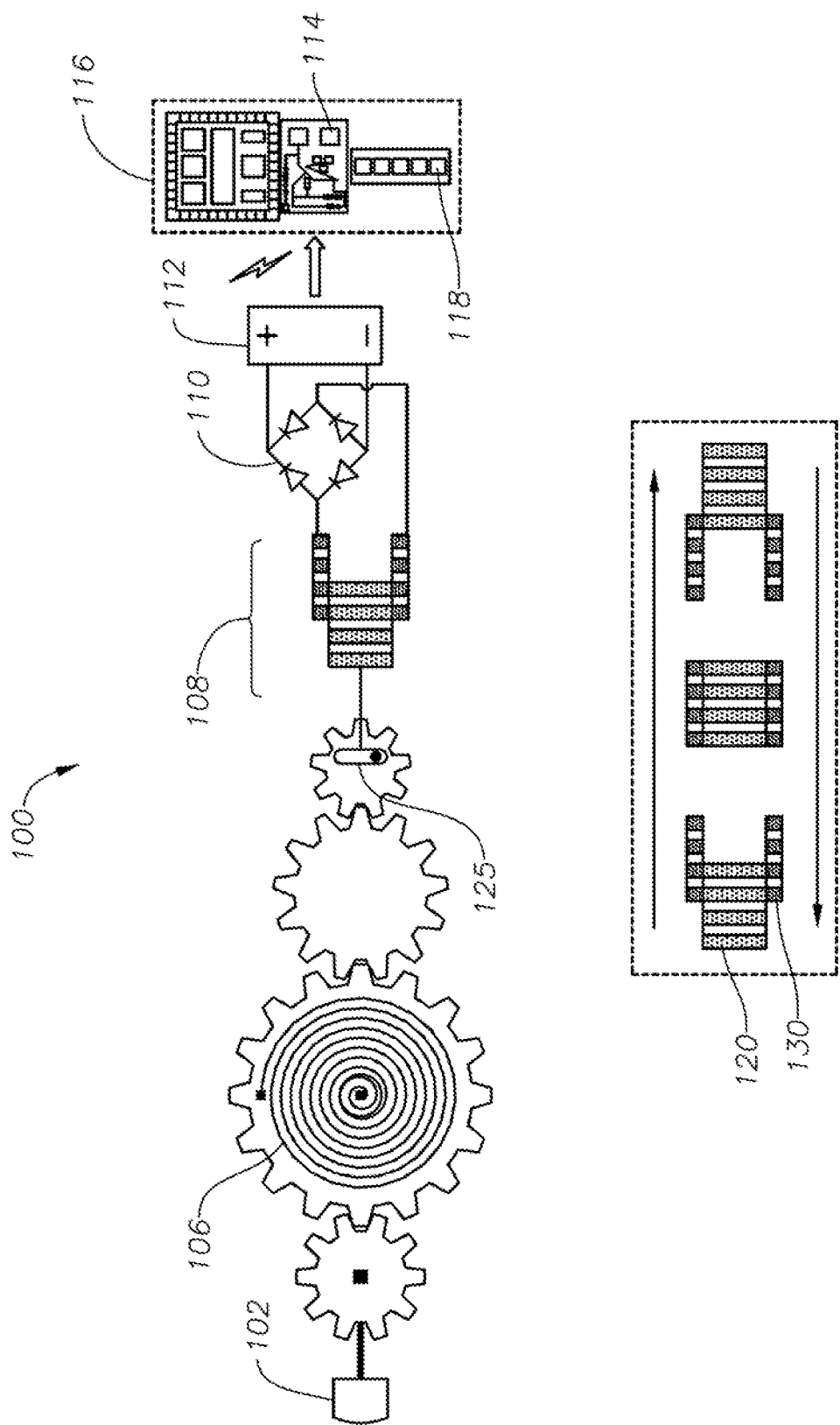

FIGS. 5A and 5B illustrate alternate embodiments of the SWPG device 100 where a scotch yoke 128 is used instead of a slider-crank 125 to create the same motion and generate electricity as in FIGS. 4A and 4B, respectively.

Figure 6A:
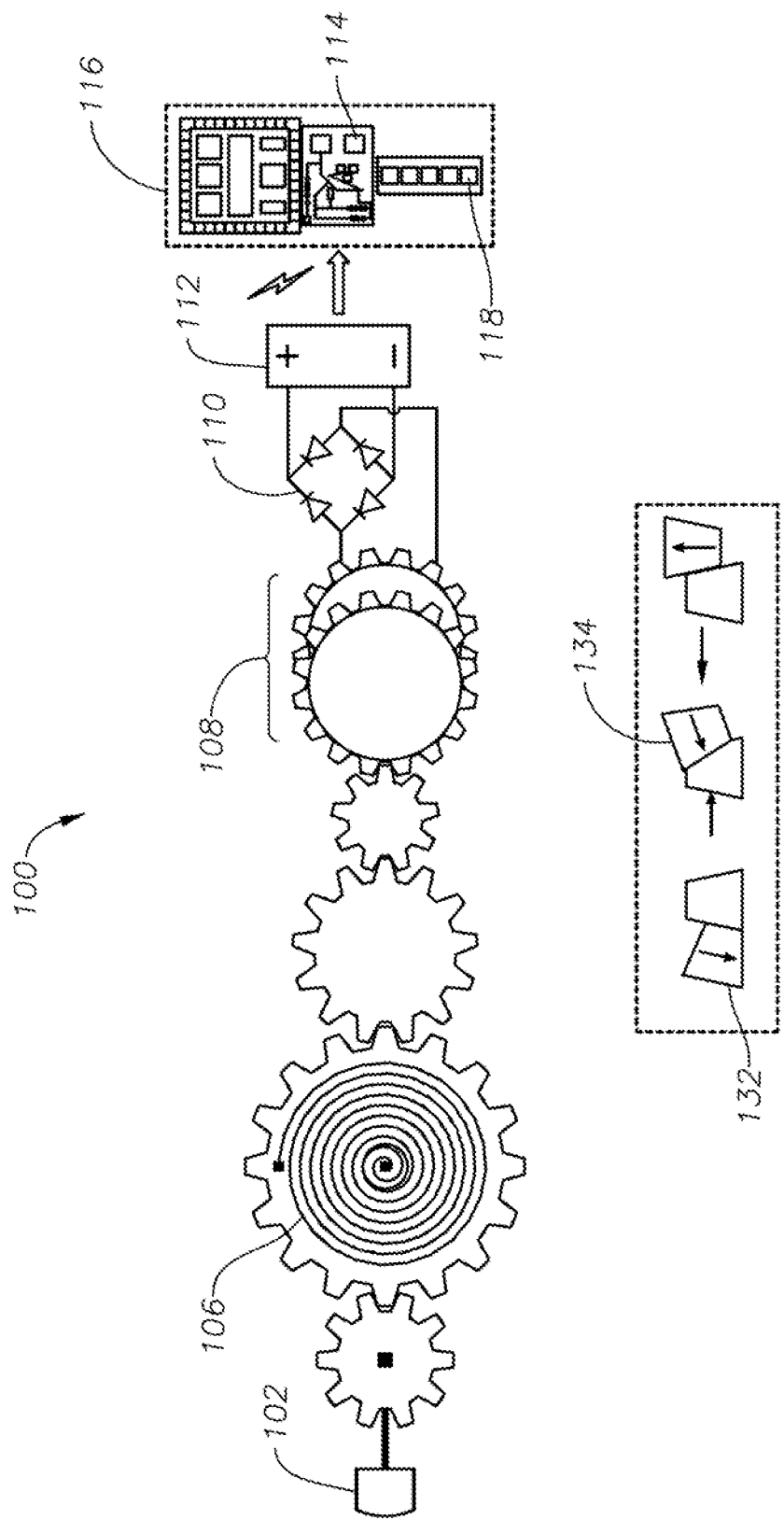
FIGS. 6A and 6B show a schematic of a high temperature, self-winding, downhole power generating device comprising a gear train connected to a module generating power by utilizing piezoelectric materials, sensors, microcontroller/microprocessor and a communications module, according to one or more example embodiments.
Figure 6B:
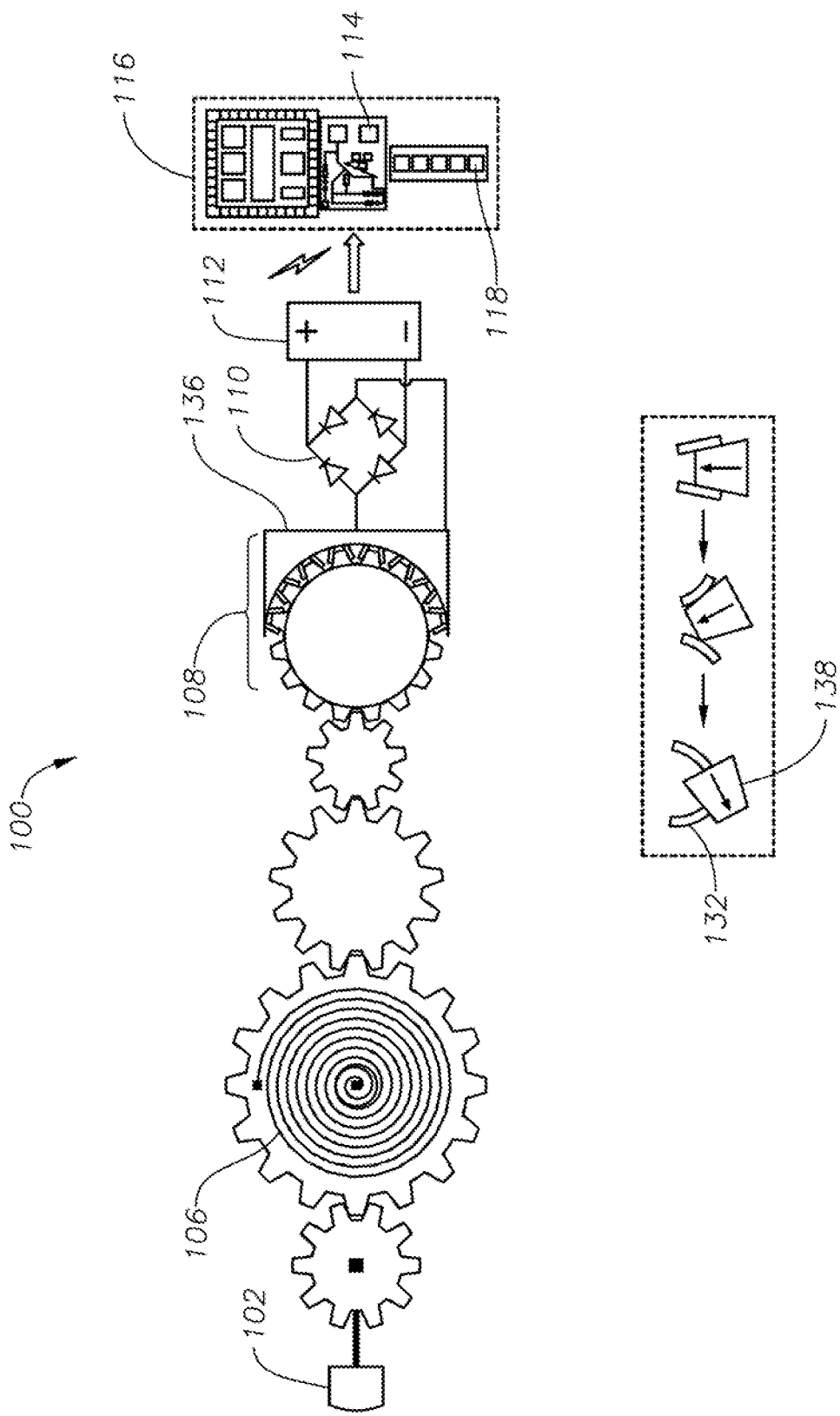

FIG. 6A illustrates another embodiment of SWPG device 100 where an array of piezoelectric material 132 can be stressed by coming into contact with an array of another structure 134 that causes the piezoelectric material 132 to develop stress. This mechanical stress of the piezoelectric material 132 generates electricity in power generation module 108. The piezoelectric material 132 can be quartz, langasite, lithium niobate, titanium oxide, or any other material exhibiting piezoelectricity. The constant kinetic motion due to the spring 106 rewinding through the gear train 104 enables the piezoelectric material 132 to go through the motion of being stressed and released and generate electricity at the frequency of rotation. FIG. 6B illustrates an alternate embodiment where the piezoelectric material 132 mounted on a fixed structure 136 is stressed by the teeth of a gear 138 that rotates within the structure 136.

Figure 7A:
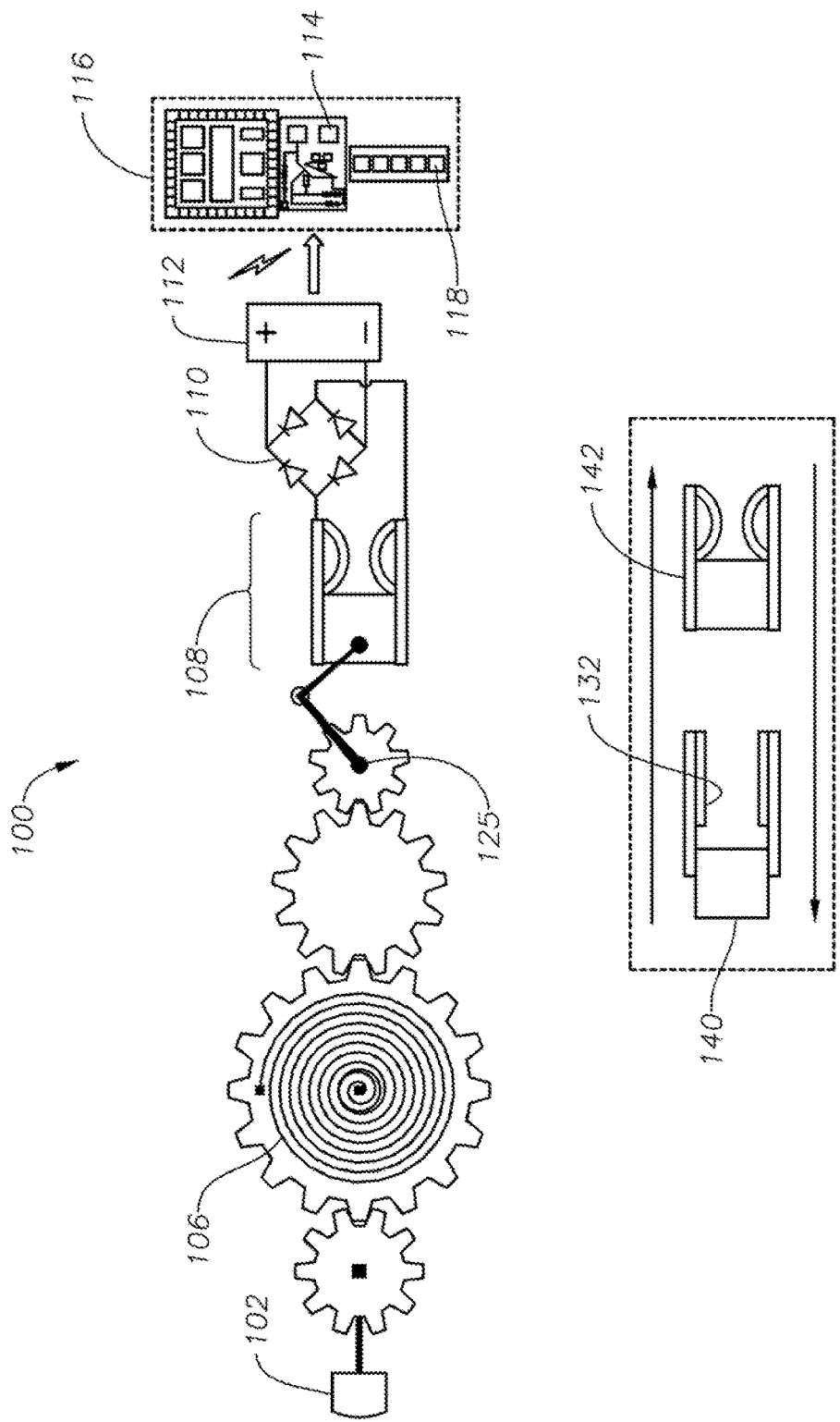
FIGS. 7A and 7B show a schematic of a high temperature, self-winding, downhole power generating device comprising a gear train with a slider-crank connected to a module generating power by utilizing piezoelectric materials, sensors, microcontroller/microprocessor and a communications module, according to one or more example embodiments.
Figure 7B:
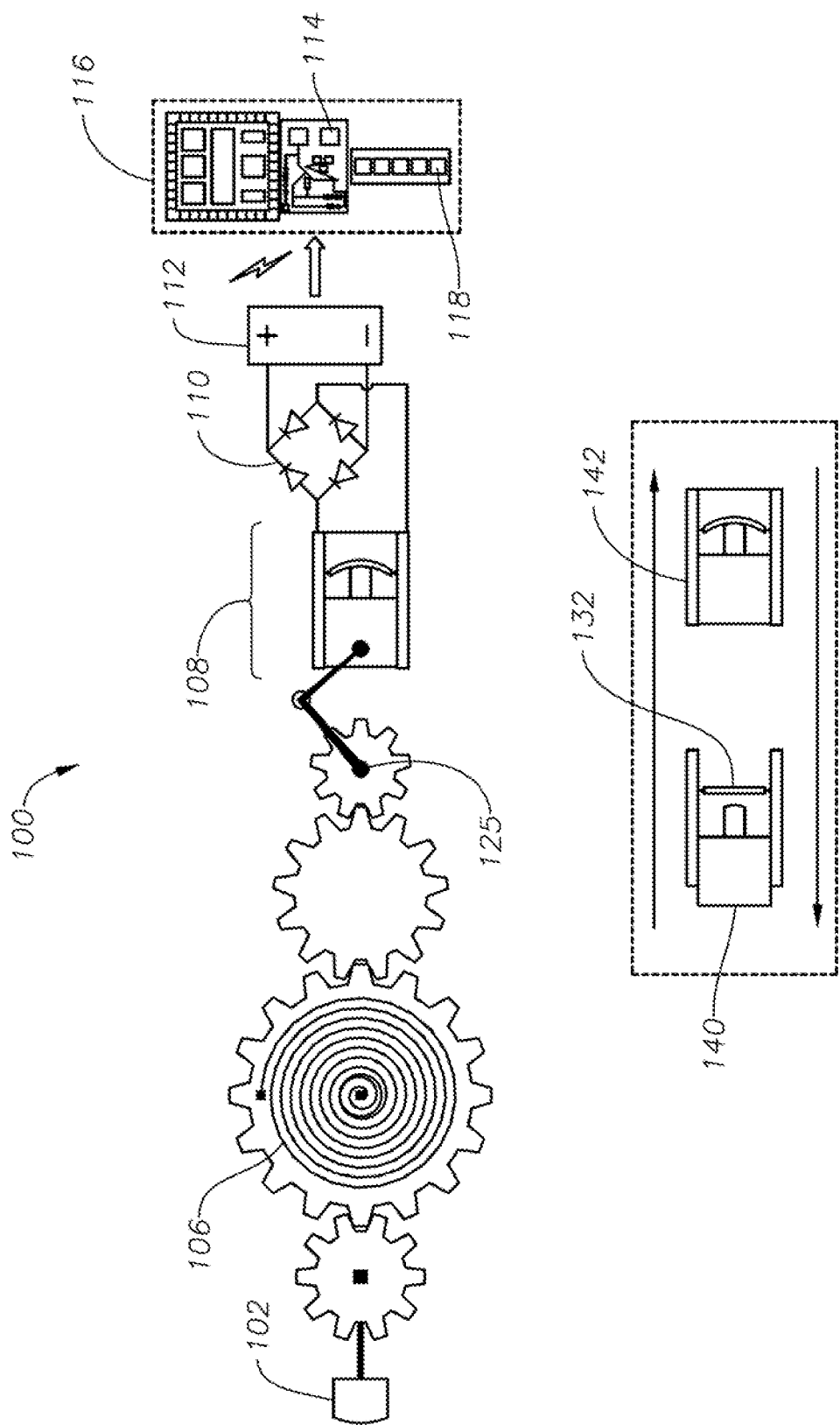
Figure 8A:
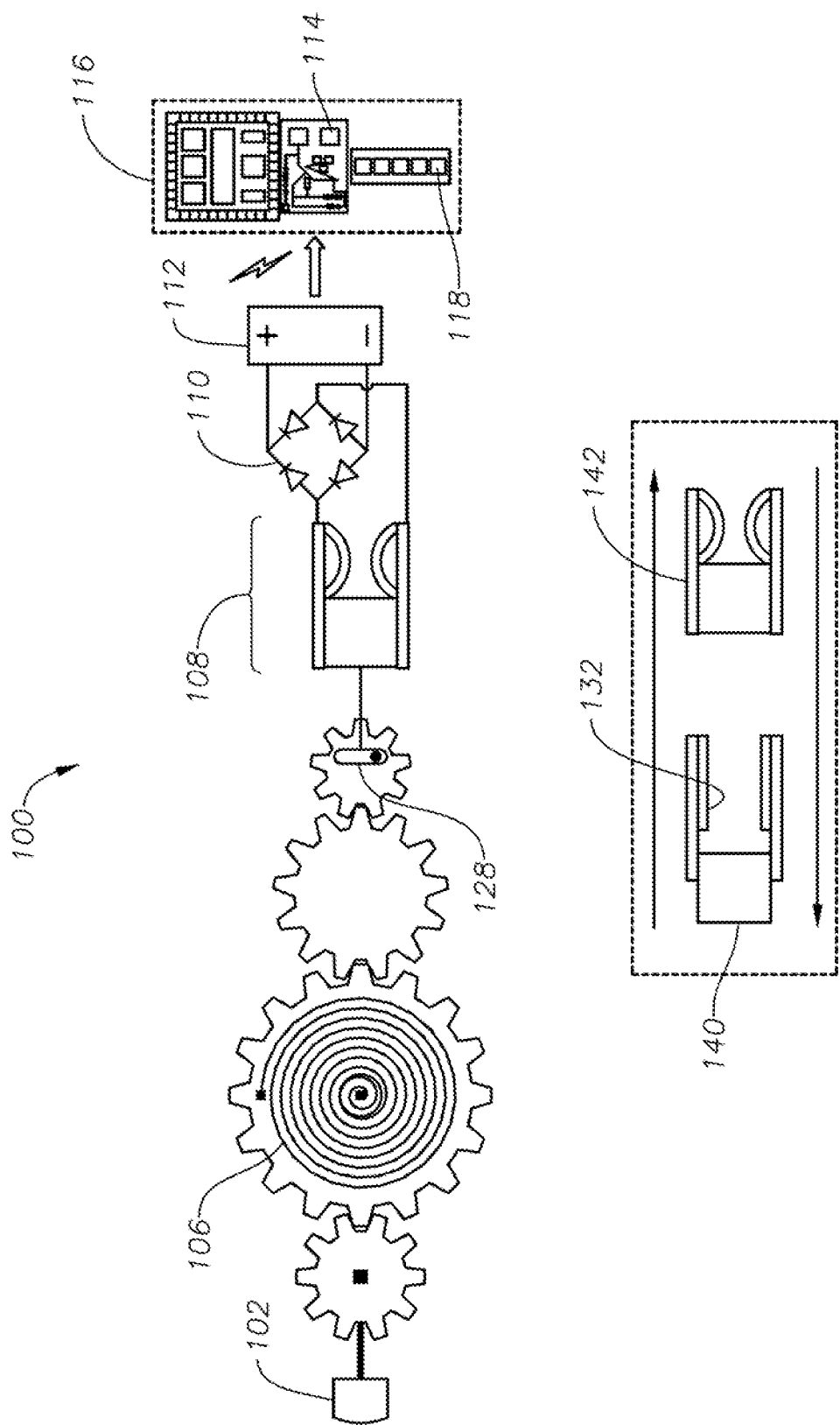
FIGS. 8A and 8B show a schematic of a high temperature, self-winding, downhole power generating device comprising a gear train with a scotch-yoke connected to a module generating power by utilizing piezoelectric materials, sensors, microcontroller/microprocessor and a communications module, according to one or more example embodiments.
Figure 8B:
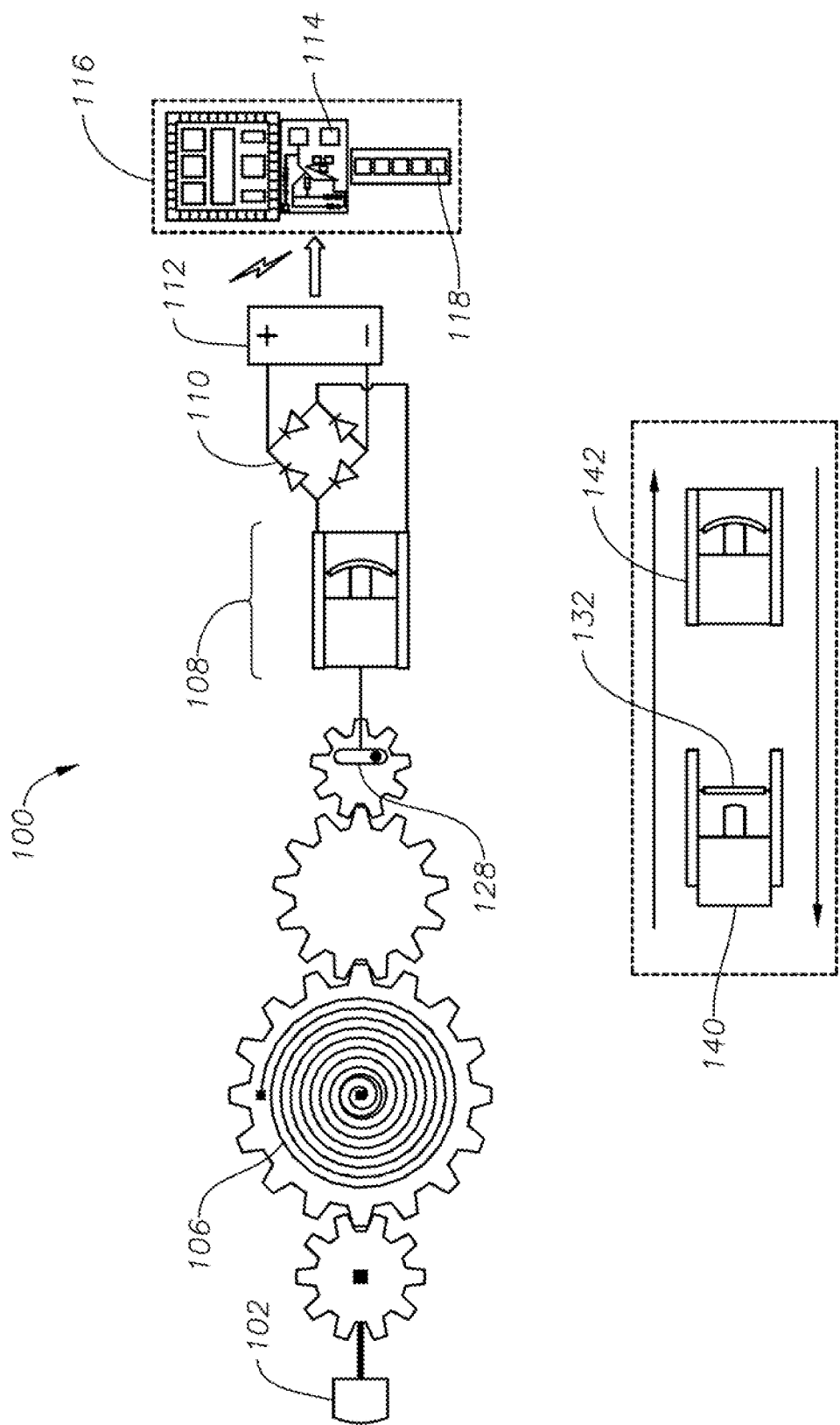

FIG. 7A illustrates another embodiment of SWPG device 100 where a slider-crank 125 can be used to push an object 140 connected to the slider-crank 125 towards a piezoelectric material 132 that is placed on top and bottom of a fixed structure 142. A mechanical stress is applied on the piezoelectric material 132 when the object comes into contact with the object 140 and released when the object 140 moves away from the piezoelectric material 132. FIG. 7B illustrates another embodiment of SWPG device 100 where the top and bottom of a piezoelectric material 132 is secured onto a fixed structure 142. A mechanical stress is applied to the center of the piezoelectric material 132 when the slider-crank 125 pushes the object 140 towards the piezoelectric material 132. FIGS. 8A and 8B illustrate alternate embodiments of SWPG device 100 where the sliding motion is generated by a scotch-yoke 128 instead of a slider-crank 125 as shown in FIGS. 8A and 8B.

Figure 9B:
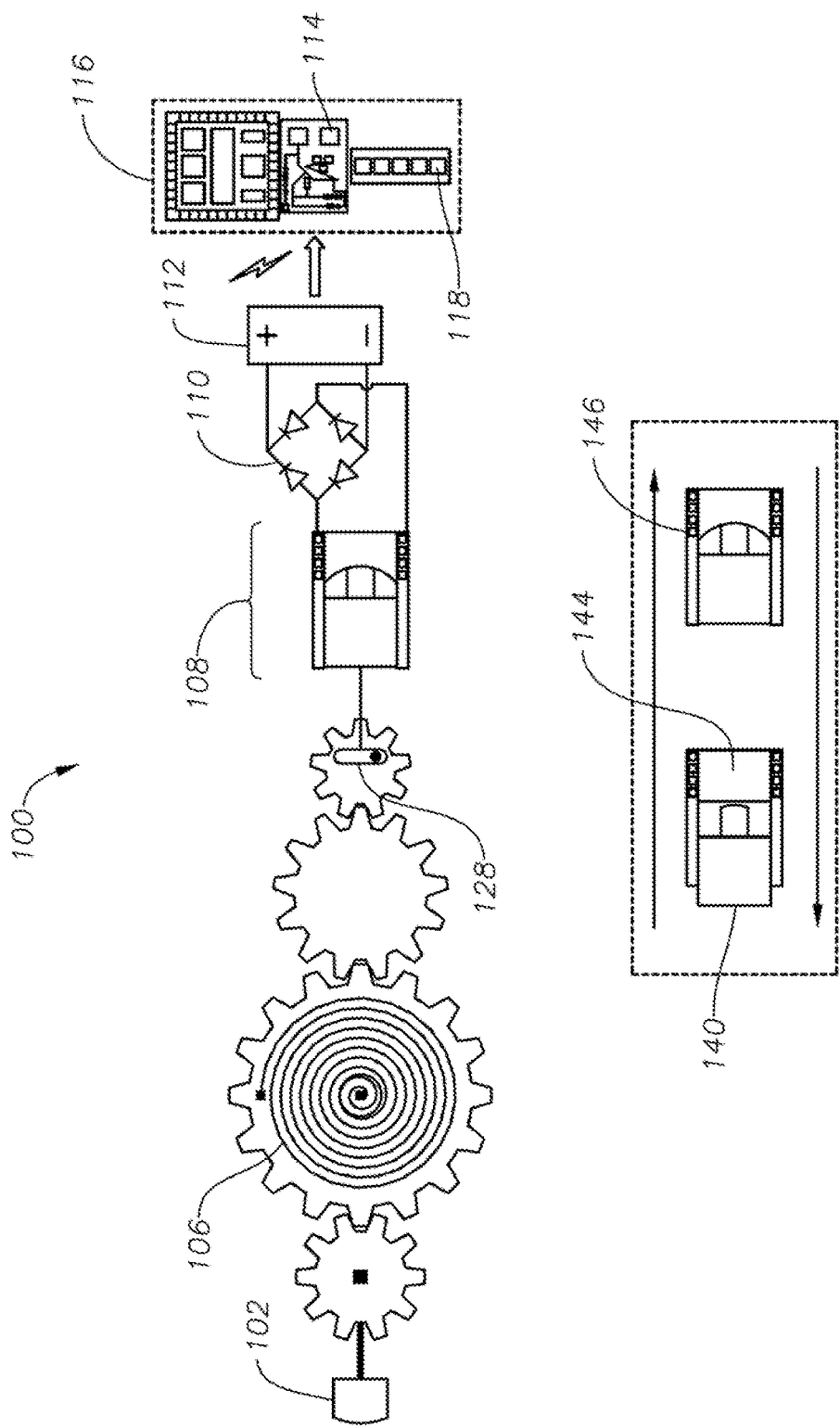
FIG. 9B shows a schematic of a high temperature, self-winding, downhole power generating device comprising a gear train with a scotch-yoke connected to a module generating power by utilizing magnetostrictive materials, sensors, microcontroller/microprocessor and a communications module, according to one or more example embodiments.

FIG. 9A illustrates another embodiment of SWPG device 100 where the mechanical stress is applied to a magnetostrictive stressable material 144 by an object 140 driven by a slider-crank 125. The magnetostrictive material 144 can be Terfenol-D, Galfenol, Metglas, or any other material that shows magnetostricitve properties. The stress applied periodically to the magnetostrictive material 144 due to the unwinding of the spiral spring 106 and the slider-crank 125 results in a change in the magnetic field of the magnetostrictive material 144, and this changing magnetic field can be converted to electrical energy by a pick-up coil or a solenoid 146, as shown in FIG. 9A. FIG. 9B illustrates another embodiment of SWPG device 100 where a scotch-yoke 128 is used instead of a slider-crank 125 to push the object 140 and apply a mechanical stress to the magnetostrictive material 144.

One advantage of the SWPG device 100 is that it is batteryless, high-temperature resistant, and can provide controlled energy release independent of drilling fluid flow. The SWPG device 100 can also be easily assembled and disassembled into separate modules, and therefore can be made up and run inside a well, and disassembled for maintenance rapidly.

Figure 10:
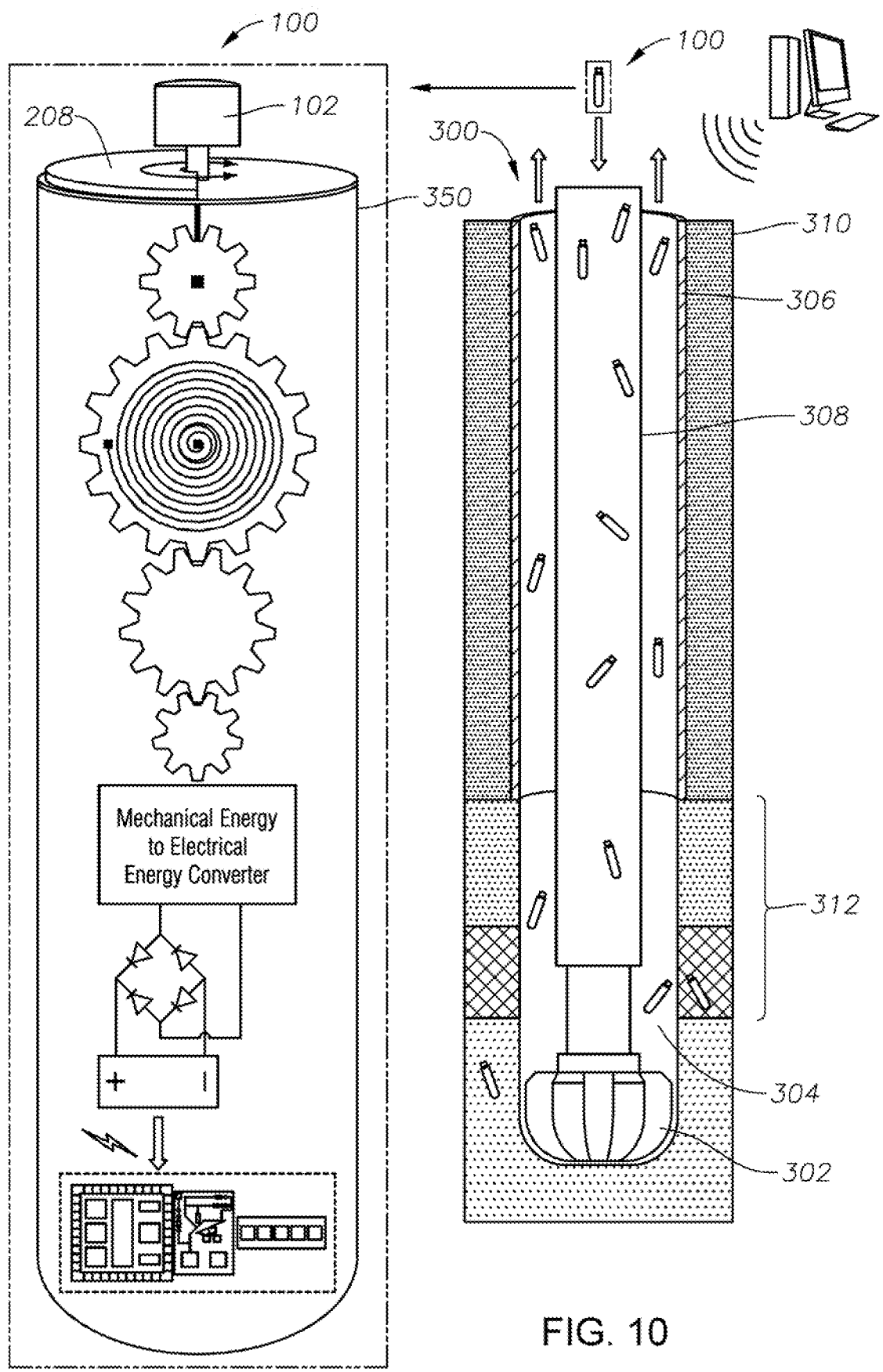
FIG. 10 is a schematic of a mobile device including a self-winding power generating device, where a plurality of these devices can be dropped into a well, according to one or more example embodiments.

FIG. 10 is a schematic of a system 300 including a plurality of SWPG devices 100, according to one or more example embodiments. FIG. 10 illustrates how the SWPG device 100 can be scaled down to a capsule to drive ultra-low-power sensors and electronics in a drilling operation. The mobile capsules 100 are dropped down a well from the surface 310 and they travel with the drilling fluid flow down the well, out of the drill bit 302, then back up the annulus 304 and casing 306, and all the way to the surface 310. Since the sensors are ultra-low-power, the electricity generated by the SWPG device 100 is sufficient to drive the sensors on their surface-downhole-surface trip. Moreover, the spiral spring 106 is constantly rewound due to the motion of the rotor weight 208 in the SWPG 100 in the turbulent drilling fluid flow, which means that the mobile capsules 100 can be continuously active without the need for manual power rewinding. This way a continuous data stream of downhole parameters can obtained at the surface 310 wirelessly through an interrogator (not shown) at the surface 310, which reads the data from the mobile capsules 100. A multitude of ultra-low-power sensors that measure parameters such as pressure and temperature can be incorporated into the mobile capsules 100. The SWPG devices 100 have the possibility to get as close as possible to the geological formations 312 to measure formation data since they travel with the mud, a significant advantage compared to wireline logging and MWD/LWD tools, and provide a complete profile of the wellbore. Moreover, by sending several SWPG devices 100 downhole high resolution/spatial data can be obtained all around the wellbore.

Figure 11:
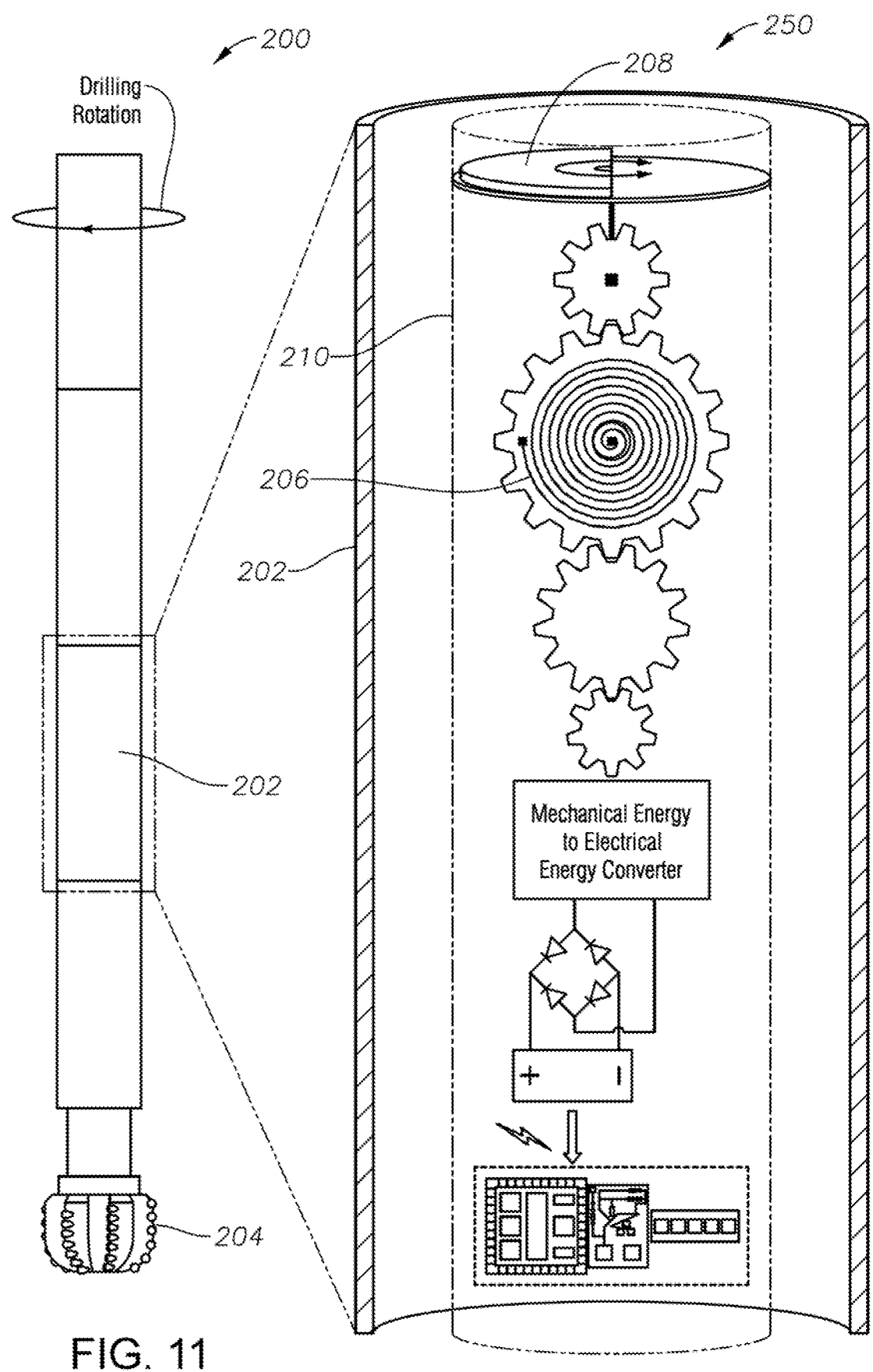
FIG. 11 is a schematic of a drilling sub for monitoring well conditions downhole including a self-winding power generating device, according to one or more example embodiments.

FIG. 11 illustrates drillstring system 200 including a drilling sub 202 comprising a SWPG device 210. The drillstring 200 is always rotating when tripping in the wellbore, drilling a formation, and when tripping out. These motions create a significant amount of energy that can be harnessed and fully exploited to drive useful mechanical motions. For example, FIG. 11 shows an oscillating rotor weight 208 connected to the SWPG 210 that turns on a pivot and how the motion of the rotation of the drillstring 200 is converted to rotational motion of the rotor weight 208. Since the magnitude of the drillstring 200 rotation motions can be significant, the rotor weight 208 rotations are translated to the spiral spring 206 in the SWPG device 210 through reverser and reducer gears. The rotor weight 208 is designed to wind the spiral spring 206 when the drillstring 200 is rotated in both clockwise and anti-clockwise directions. The example given here is a very basic example for rewinding the spiral spring 206 using the rotation of the drillstring 200 and a significant number of methods can be utilized for rewinding the spiral spring 206 by exploiting the rotation of the drillstring 200. The housing of the SWPG device 210 must be robust enough to withstand high temperature, high pressure, corrosive, and abrasive environments as well as vibrations and shocks experienced by the drillstring 200 and drilling sub 202. Moreover, the housing material should be able to preserve the integrity of the mechanical and electrical operations of the SWPG device 210 by isolating and protecting the modules inside the SWPG device 210 from drilling fluids and other fluids in the formation, which may degrade their performance. The housing can be designed from materials such as Pyroflask, Titanium, Steel, Silicon Carbide, Inconel, or any other material that can withstand high temperature, high pressure, corrosive, and abrasive environments, or any polyether-based polyurethane material with visco-elastic properties to absorb shocks and vibrations.

The shell 350 that the sensors are enclosed in must be robust enough to withstand the high temperature, high pressure corrosive and abrasive environments. Moreover, the shell material should be able to preserve flexibility and elasticity to improve the energy conversion efficiency of the power generator. The shell 350 can be designed from a polymer material such as elastomer, which is already used in downhole tools, or any other material that has excellent heat conduction properties and a low Young's modulus. Packaging and encapsulation is mainly done to protect the device components from mud and other fluids in the formation, which may degrade its performance. However, it is important that the packaging and encapsulation does not in any way diminish the energies being harvested. The packaging and encapsulation should maintain or amplify the energies being harvested. In order to minimize vibrations in the sensors, electronics and the communication module they can be mounted and installed in ways to isolate vibrations. Chemical coatings can be used to further protect the device and its components from the harsh downhole environment. They can be polymeric coatings, which can be used to provide a uniform and pinhole free layer on sensor and electronic boards. These coatings can withstand continuous exposure to high temperatures for long periods of time, prevents corrosion of electrodes and is an excellent dielectric. Thermal insulation significantly extends the life and durability of the sensors and electronics. The outer protective shell 350 shields all the components inside from the environment and can be epoxy, resin-based materials, or any material that has good thermal conductivity properties.

Figure 12:
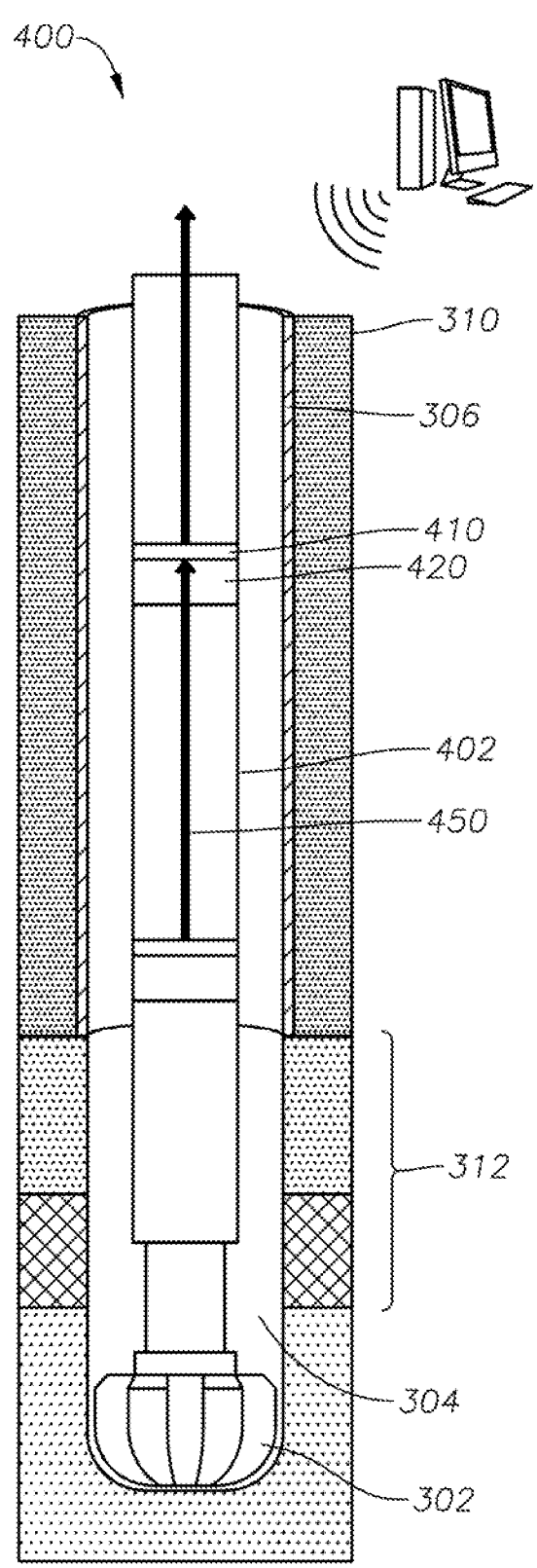
FIG. 12 is a schematic of a system for wirelessly monitoring well conditions including a string of self-winding power generating devices and wireless transceivers, according to one or more example embodiments.

FIG. 12 is a schematic of a system 400 for wirelessly monitoring well conditions including a string of wireless transceivers 410, according to one or more example embodiments. FIG. 12 illustrates data units 420 consisting of SWPG devices 100 integrated with sensors and transceivers can be placed along a drillstring 402 to measure downhole geological and drilling parameters as well as transmit this data along a communications channel along a drillstring 402 in real time. This type of wireless mode data telemetry can be low-power electromagnetic radiation such as Wi-Fi, Bluetooth, Bluetooth Low Energy, and ZigBee, for example, and data can be transmitted along the drillstring 402 wirelessly, moving along the data units 420 as in a relay from the bottom to the surface and from the surface to the bottom. The data units 420 can be placed inside or outside a drillstring 402 at a distance chosen based on the maximum distance an electromagnetic wave can radiate from one data unit 420 to another 420. This method of transmitting data along the drillstring 402 using data units 420 is independent of drilling fluid flow, faster than mud pulse telemetry, and can be very useful in a lost circulation scenario. For example, when the bottom hole temperature is required for designing thermosetting lost circulation material (LCM) such as resin material to cure the losses, this methodology may be very helpful. The success of a thermosetting LCM resin depends on how accurately the hardening temperature of the viscous LCM is matched to the bottomhole temperature. Inaccurate bottomhole temperatures can result in the resin LCM setting inside the drillstring 402 or not setting at all downhole and only existing in a gel-like state in the lost circulation zone thereby not being able to plug fractured formations.

Figure 13:
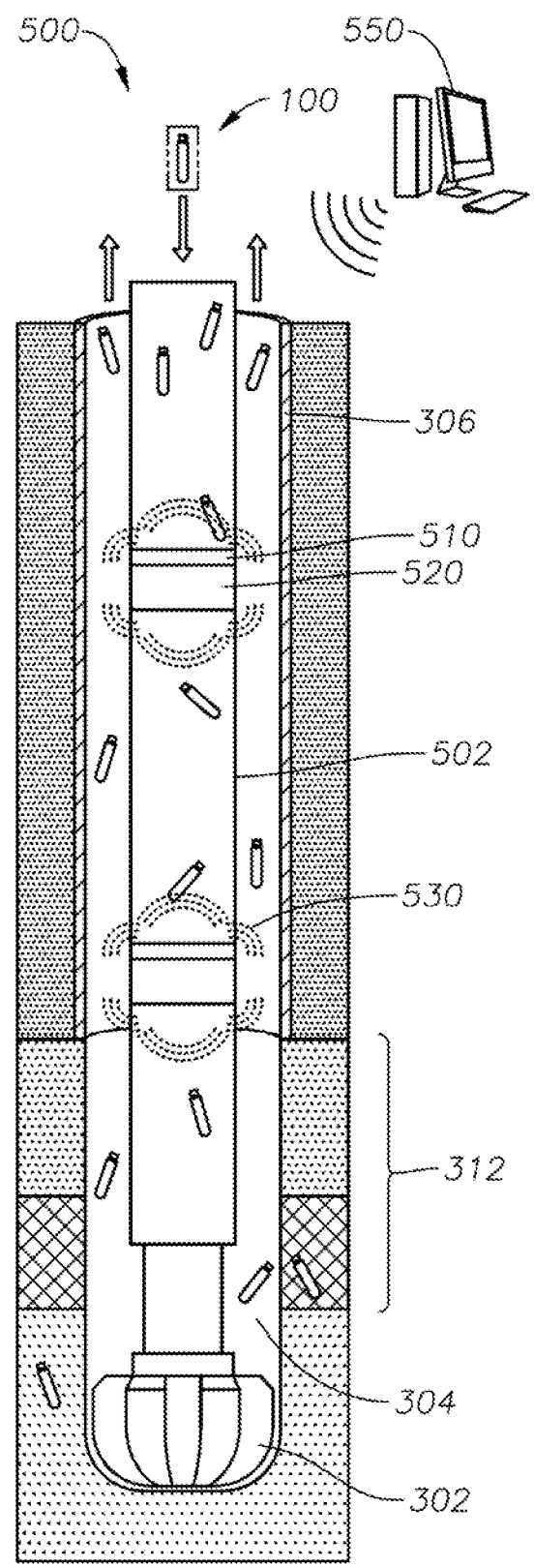
FIG. 13 is a schematic of a system for wirelessly monitoring well conditions including a plurality of mobile self-winding power generating devices and a string of self-winding power generating devices and wireless transceivers, according to one or more example embodiments.

FIG. 13 is a schematic of a system 500 for wirelessly monitoring well conditions including a plurality of SWPG devices 100 and a string of wireless transceivers 510, according to one or more example embodiments. In this example, SWPG devices 100 integrated with sensors can be used as data storage units 520 along a drillstring 502 assembly as shown in FIG. 13. The data storage units 520 collect information and store it in memory. Memory gathering mobile capsules 100 are then injected into the well from the surface 510. The data stored in the storage units 520 can then be transferred to the capsules 100 as they flow past the units 520. The capsules 100 circulate with the drilling fluid and are recovered at the surface 510 where the data can be downloaded by wired or wireless means. The memory of the capsules 100 can be erased before they go inside the well again so that there is sufficient space to store data in the next circulating cycle.

According to one example embodiment, SWPG devices 100 can also transmit downhole data to a set of transceivers 510 placed along a drillstring 502 in system 500. The transceivers 510 transfer the data from one to another, as in a relay, to a surface computer 550. Therefore, any data received by repeaters/readers/transceivers from a SWPG device 100 can be immediately transmitted to the surface computer 550 and gradients of important wellbore parameters such as pressure and temperature can be immediately established at the surface. To this effect, the transceivers 510 along the drillstring 502 act as a dedicated high speed communication channel. This is one of the main advantages of the system proposed system as the real-time/near real-time access to bottomhole data is of utmost importance to the driller to conduct a safe and efficient drilling operation. This information can also be confirmed once the SWPG device 100 is recovered at the surface and data is downloaded from its memory. Another main advantage of the SWPG devices 100 and the transceivers 510 is that they are self-powered and therefore, can stay in the hole as long there is mechanical/hydraulic energies in the hole.

To access a downhole tool, especially a tool in a hard to reach area, the drillstring 502 has to be pulled out of the hole, which is a time consuming and a costly procedure. Instead, a SWPG device 100 can be injected into a well to access a downhole tool as illustrated in the system 500 in FIG. 13. Here, a SWPG device 100 can be deployed to travel to the vicinity of the downhole tool and switch a downhole tool from 'sleep' to 'active' mode or change the operation mode from configuration A to B, for example. Moreover, a SWPG device 100 can also be used to download data from a downhole tool, which can be downloaded and analyzed once the SWPG device 100 reaches the surface. A batch of SWPG devices 100 can be injected downhole to perform the same procedure to confirm the downhole tool is activated. A unique feature of the system is that an SWPG device 100 does not necessarily have to reach a bottomhole tool to activate/configure it. A signal can be simply sent along the transceiver channel to the bottomhole tool to activate/configure it. If the activation/configuration depends on the values of certain wellbore parameters at a certain depth, then the mobile device can flow to this depth, measure these parameters and send a signal based on the result to the downhole tool via the transceiver channel. The downhole tool can also be used for activating, deactivating, or configuring the high temperature miniature mobile device when the device is within a predetermined distance from the tool.

Another application of a SWPG device 100 can be to accurately locate the position of a dropped object or an object obstructing the drillstring 502. The SWPG device 100 can be programmed to communicate with transceivers 510 placed along a drillstring 502, as described in the earlier embodiments. Each time a SWPG device 100 travels past a transceiver 510, the transceiver 510 sends a signal to the surface computer 550 confirming the location of the SWPG device 100. However, if there is an object obstructing the path of the SWPG device 100 then the obstruction can be identified by the sensor of the SWPG device 100.

Prior to data transfer from the transceiver T1 to the next transceiver in the array, where T1 is at/near the bottom of the well and the last transceiver (TN) is at the surface or near the surface, a low data rate 'acknowledge' signal is sent from T0 to T1. This switches T1 from 'sleep' mode to 'stand by' mode' and to finally 'active' mode. T0 switches to 'stand by' mode since it is expecting a signal back from the first transceiver. If T0 switches to 'sleep' mode instead it will take more power to switch it back to 'active' mode. Once the 'acknowledge' signal is received at T1 it sends a 'ready' signal to T0. The T0 then transmits the first data stream, from sensor A for example, to T1. Once the data is transmitted, the central processor shuts down its power to the transceiver for an amount of time determined by how long it takes for the data to be relayed along the transceiver array to the surface. The central processor can wait until the data reaches the surface or until it reaches half the distance along the drill string or any other pre-determined time before it sends an acknowledge signal again to the first transceiver to transmit the next data stream, from sensor B, for example. This has to be optimized according to the downhole environment the drill string is exposed to, such as the mud type and geological formations, which can affect the data transmission rate.

Once T1 receives data from T0 it stores it in memory and then sends a signal to T3, located a distance 'x' away from T1, to check if it is ready to receive data. The distance 'x' is the maximum distance a signal can be transmitted between two transceivers. If T3 is ready it sends a signal back saying it is ready as explained before. Then the first transceiver transmits data to T3. T3 then performs the same functions as T1 starting by sending a signal to T5. In the event T1 does not get a signal back from T3, T1 sends another signal again to confirm. If there is still no signal T1 sends a signal to T2, where the transmission distance is x/2; x/2 is half the maximum distance a signal can be transmitted between two transceivers. If there is a confirmation signal back from T2 then T1 transmits the data to T2. T2 then performs the same process T1 performed, transfer data to T4, in order to transfer the data up the drill string, all the way to the surface. Another method of data transmission is for T1 to send a signal to T2, located a distance x/2 away from T1, to check if it is ready to receive data. If T2 is ready it sends a signal back saying it is ready as explained before. Then the first transceiver transmits data to T2. In the event T1 does not get a signal back from T2, T1 sends another signal again to confirm. If there is still no signal T1 sends a signal to T3, where the transmission distance is x; x is the maximum distance a signal can be transmitted between two transceivers. If there is a confirmation signal back from T3 then T1 transmits the data to T3. T3 then performs the same process T1 performed in order to transfer the data up the drill string, all the way to the surface. This way the communication link from downhole to the surface can be kept active even in the event one transceiver in the array along the drill string may cease to function. This method is based on the assumption that it is very unlikely two immediate transceivers would fail and cease to function. If the need arises to increase the number of transceivers a given transceiver can transmit to from 2 to N, then the maximum distance a signal can be transmitted between two transceivers can be divided by N; the distance between two immediate transceivers on the drill string will then be x/N.

Systems described in the above example embodiments include wireless communication technology as a data transmission method. Data transmission data rates up to a million times faster than mud pulse telemetry (bits per second to megabits per second) can be achieved by coupling wireless communication technology with transceivers placed at specific locations in the drill string to transmit data from the MWD and LWD tools to the surface. Increased data transmission rates provides significant advantages in a drilling environment such as the opportunity to immediately respond to well control problems and revise mud programs. The mud pulse telemetry system is replaced by an array of transceivers placed at specific locations on the drill pipe, from the bottom of the well to the surface. Each transceiver is connected to the power generator mentioned above and is triggered by mechanical/hydraulic motions in a downhole drilling environment. The distance between these transceivers are dependent on the wireless communication technologies used, the power provided by the power generator, the downhole environment and the power management circuit of the microcontroller amongst other variables. This transceiver array transmits data, from one transceiver to another as in a relay, from the bottom to the surface of the well. Due to the increased speed of wireless communication compared to mud pulse telemetry more data can be sent per second increasing the resolution of the data obtained at the surface.

Sensors can be integrated with the communication module described in the above example embodiments. This is achievable since the sensors and the transmitters do not operate simultaneously. Once a tool stops it operation it can shut down and go to sleep to reduce power usage. The instructions to do so are handled by the microcontroller unit. The smart drill pipe gives real time distributed sensing data, which can be used to effectively monitor the well and respond immediately if there is a problem. The number and type of sensors in a communication module depend on the availability of power at each communication module.

Advancements in MEMS (micro-electro-mechanical systems) technology have paved the way for building these devices at the micro/nano scale and then integrating them together to create low-cost, miniature, smart, SWPG devices that can be used in challenging applications. SWPG devices are useful in downhole applications because they can be deployed down a well with mud flow to measure downhole parameters. They can flow right to the bottom of a well and up again to the surface therefore, providing a full profile of the wellbore. In the embodiments disclosed above, examples of how SWPG devices provide clear advantages over current technologies such as wireline and MWD/LWD with respect to size, cost, sensitivity, power, mobility and potential downhole applications are shown. The present disclosure describes how energy can be harvested by the motion of SWPG devices in a flow and how this energy can be converted to electricity to power the sensors, instrumentation and communication module in the devices. It also describes several applications of these SWPG devices such as sensing, actuating, monitoring as well as transmitting and receiving data in a downhole environment.

Accordingly, disclosed is a self-winding power generator (SWPG) device that utilizes energy stored in springs, the motion of mechanical gears, and energy harvesting materials, to generate power in a constant, controlled manner in downhole environments, independent of the drilling fluid flow. The motions created while drilling in a downhole environment can be used for automatic rewinding of the spring. The generated electricity can be used to power downhole sensors and instrumentation, which are used to acquire information about the surrounding geological formations as well as directional data of a wellbore.

The Specification, which includes the Summary, Brief Description of the Drawings and the Detailed Description, and the appended Claims refer to particular features (including process or method steps) of the disclosure. Those of skill in the art understand that the present disclosure includes all possible combinations and uses of particular features described in the Specification. Those of skill in the art understand that the disclosure is not limited to or by the description of embodiments given in the Specification. Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements, or operations. Thus, such conditional language generally is not intended to imply that features, elements, or operations are in any way required for one or more implementations.

The systems and methods described herein, therefore, are well adapted to carry out the objects and attain the ends and advantages mentioned, as well as others inherent therein. While example embodiments of the device, system, and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A self-winding power generation device comprising:
   a mechanical winding knob for receiving mechanical energy from a downhole environment;
   a gear train comprising a plurality of gears engaged with each other, wherein a first gear in the gear train is operatively connected to the mechanical winding knob, and configured to receive mechanical energy from the mechanical winding knob and transfer the mechanical energy to a second gear in the gear train;
   a spiral spring attached to one of the gears in the gear train, the spiral spring configured to self-wind and store the mechanical energy upon receiving the mechanical energy from the first gear;
   a power generation unit configured to receive the mechanical energy from a last of the plurality of gears and convert the mechanical energy into electrical energy; and
   a bridge rectifier operatively connected to the power generation unit, the bridge rectifier configured to convert AC, received from the power generation unit, to DC, where
   the self-winding power generation device is configured to be dropped down a well and travel with a drilling fluid down the well, out of a bit, then back up an annulus and casing all the way to the surface, where data from the self-winding power generation device is transferred to a computer on a drilling surface.

2. The device according to claim 1, wherein the spiral spring is further configured to unwind and drive the gear train when there is insufficient transfer of mechanical energy from the first gear.

3. The device according to claim 1, further comprising:
   a power storage unit operatively connected to the bridge rectifier, the power storage unit configured to receive and store DC from the bridge rectifier.

4. The device according to claim 3, wherein the power storage unit comprises one of ceramic film capacitors, electrolytic capacitors, supercapacitors, double-layer capacitors, or pseudo-capacitors.

5. The device according to claim 3, further comprising:
   at least one sensor that gathers information concerning the downhole environment; and
   a microcontroller and transceiver unit configured to manage the power generated by the power generation unit and transmit information gathered by the at least one sensor, wherein the at least one sensor is operatively connected to the microcontroller.

6. The device according to claim 5, wherein the transceiver unit is configured to communicate over a wireless communication method selected from the group consisting of Wi-Fi, Wi-Fi Direct, Bluetooth, Bluetooth Low Energy, and ZigBee.

7. The device according to claim 5, further comprising:
   a shell for housing one or more of the following:
   the gear train, the spiral spring, the power generation unit, the bridge rectifier, the energy storage unit, the at least one sensor, and the microcontroller and transceiver unit.

8. The device according to claim 7, wherein the shell comprises a material selected from the group consisting of polymeric materials, elastomers, coatings of epoxy, resin-based materials, pyroflask, titanium, steel, silicon carbide, Inconel, a material that can withstand high temperature, high pressure, corrosive and abrasive environments, and a polyether-based polyurethane material with visco-elastic properties to absorb shocks and vibrations.

9. The device according to claim 1, wherein the power generating unit further comprises:
   a first material of one polarity and a second material of opposite polarity to the first material, wherein the first material comes in contact with the second material and are separated from each other upon motion of the gear train so that the two materials have a maximized point of contact and separation to generate maximum power; and
   at least one electrode that is connected to the first material or second material, wherein the first and second materials are selected from the group consisting of Polytetrafluoroethylene (PTFE), Polyethylene terephthalate (PET), P oly dimethyl acryl ami de (PDMA), Polydimethylsiloxane (PDMS), Polyimide, Copper, Silver, Aluminum, Lead, Elastomer, Teflon, Kapton, Nylon and Polyester.

10. The device according to claim 9, wherein the first material is included in a first gear in the gear train, and the second material is included in a second gear adjacent to or in contact with the first gear.

11. The device according to claim 9, wherein the second material is constant, and the first material is propelled towards the second material by means of a slider crank operatively connected to the last gear in the gear train such that the first material slides over the second material.

12. The device according to claim 9, wherein the second material is constant, and the first material is propelled towards the second material by means of a slider crank operatively connected to the last gear in the gear train such that the first material slides through the second material.

13. The device according to claim 9, wherein the second material is constant, and the first material is propelled towards the second material by means of a scotch yoke operatively connected to the last gear in the gear train such that the first material slides over the second material.

14. The device according to claim 9, wherein the second material is constant, and the first material is propelled towards the second material by means of a scotch yoke operatively connected to the last gear in the gear train such that the first material slides through the second material.

15. The device according to claim 9, wherein the power generation unit comprises a piezoelectric material.

16. The device according to claim 15, wherein the piezoelectric material is included as an array in a first gear in the gear train, and the other material is included as an array in a second gear adjacent to or in contact with the first gear.

17. The device according to claim 15, wherein piezoelectric materials are mounted on a fixed structure, and the other material is included as an array in the last gear, where the piezoelectric materials are stressed and released upon the motion of the gear train.

18. The device according to claim 15, wherein the piezoelectric material is fixed, and the other material is propelled towards the piezoelectric material by means of a slider-crank operatively connected to the last gear in the gear train so that the piezoelectric material is stressed and released upon the motion of the gear train.

19. The device according to claim 15, wherein the piezoelectric material is fixed, and the other material is propelled towards the piezoelectric material by means of a scotch-yoke operatively connected to the last gear in the gear train so that the piezoelectric material is stressed and released upon the motion of the gear train.

20. The device according to claim 9, wherein the power generation unit comprises a magnetostrictive material.

21. The device according to claim 20, wherein the magnetostrictive material is fixed, and the other material is propelled towards the magnetostrictive material by means of a slider-crank operatively connected to the last gear in the gear train such that the magnetostrictive material is stressed and released upon the motion of the gear train.

22. The device according to claim 20, wherein the magnetostrictive material is fixed, and the other material is propelled towards the magnetostrictive material by means of a scotch-yoke operatively connected to the last gear in the gear train such that the magnetostrictive material is stressed and released upon the motion of the gear train.

23. The device according to claim 1, further comprising:
an oscillating rotor weight configured to automatically rewind the spiral spring harnessing the mechanical energies in a downhole environment, wherein the mechanical energy in the downhole environment is caused due to drillstring rotation when tripping in or out of the wellbore, when stationary and drilling a formation, or due to turbulent drilling fluid flow, wherein the rotor weight rotations are translated to the spring through reverser or reducer gears.

24. The device according to claim 23, wherein the gears comprise a material that has high temperature resistance and strength, including thermoplastics, resins, polymers, carbon, steel, or any metal or alloy.

25. The device according to claim 1, wherein the spiral spring comprises a material selected from the group consisting of super alloys, carbon nanotubes, and graphene.

26. A self-winding power generating device for monitoring well conditions, the device comprising:
a mechanical winding knob for receiving mechanical energy from a downhole environment;
a gear train comprising a plurality of gears engaged with each other, wherein a first gear in the gear train is operatively connected to the mechanical winding knob, and configured to receive mechanical energy from the mechanical winding knob and transfer the mechanical energy to a second gear in the gear train;
a spiral spring attached to one of the gears in the gear train, the spiral spring configured to self-wind and store the mechanical energy upon receiving the mechanical energy from the first gear;
an oscillating rotor weight configured to automatically rewind the spiral spring harnessing the mechanical energies in the downhole environment, wherein the mechanical energy in the downhole environment is caused due to drillstring rotation when tripping in or out of the wellbore, when stationary and drilling a formation, or due to turbulent drilling fluid flow, and the rotor weight rotations are translated to the spring through reverser or reducer gears;
a power generation unit configured to receive the mechanical energy from a last of the plurality of gears and convert the mechanical energy into electrical energy; and
a bridge rectifier operatively connected to the power generation unit, the bridge rectifier configured to convert AC, received from the power generation unit, to DC, where
the self-winding generation device is configured to be dropped down a well and travel with a drilling fluid flow down the well, out of a bit, then back up an annulus and casing all the way to the surface, where data from the self-winding power generation device is transferred to a computer on a drilling surface.

27. The device according to claim 26, wherein the spiral spring is further configured to unwind and drive the gear train when there is insufficient transfer of mechanical energy from the first gear.

28. The device according to claim 26, further comprising:
a power storage unit operatively connected to the bridge rectifier, the power storage unit configured to receive and store DC from the bridge rectifier.

29. The device according to claim 28, wherein the power storage unit comprises one of ceramic film capacitors, electrolytic capacitors, supercapacitors, double-layer capacitors, or pseudo-capacitors.

30. The device according to claim 28, further comprising:
at least one sensor that gathers information concerning the downhole environment; and
a microcontroller and transceiver unit configured to manage the power generated by the power generation unit and transmit information gathered by the at least one sensor, wherein the at least one sensor is operatively connected to the microcontroller.

31. The device according to claim 30, wherein the transceiver unit is configured to communicate over a wireless communication method selected from the group consisting of Wi-Fi, Wi-Fi Direct, Bluetooth, Bluetooth Low Energy, and ZigBee.

32. The device according to claim 30, further comprising:
a shell for housing one or more of the following: the gear train, the spiral spring, the power generation unit, the bridge rectifier, the energy storage unit, the at least one sensor, and the microcontroller and transceiver unit.

33. The device according to claim 32, wherein the shell comprises a material selected from the group consisting of polymeric materials, elastomers, coatings of epoxy, resin-based materials, pyroflask, titanium, steel, silicon carbide, Inconel, a material that can withstand high temperature, high pressure, corrosive and abrasive environments, and a polyether-based polyurethane material with visco-elastic properties to absorb shocks and vibrations.

34. The device according to claim 26, wherein the power generating unit further comprises:
a first material of one polarity and a second material of opposite polarity to the first material, wherein the first material comes in contact with the second material and then separated from each other upon motion of the gear train so that the two materials have a maximized point of contact and separation to generate maximum power; and
at least one electrode that is connected to the first material or second material, wherein
the first and second materials are selected from the group consisting of Polytetrafluoroethylene (PTFE), Polyethylene terephthalate (PET), Polydimethylacrylamide (PDMA), Polydimethylsiloxane (PDMS), Polyimide, Copper, Silver, Aluminum, Lead, Elastomer, Teflon, Kapton, Nylon or Polyester.

35. The device according to claim 34, wherein the first material is included in a first gear in the gear train, and the second material is included in a second gear adjacent to or in contact with the first gear.

36. The device according to claim 34, wherein the second material is constant, and the first material is propelled towards the second material by means of a slider crank operatively connected to the last gear in the gear train such that the first material slides over the second material.

37. The device according to claim 34, wherein the second material is constant, and the first material is propelled towards the second material by means of a slider crank operatively connected to the last gear in the gear train such that the first material slides through the second material.

38. The device according to claim 34, wherein the second material is constant, and the first material is propelled towards the second material by means of a scotch yoke operatively connected to the last gear in the gear train such that the first material slides over the second material.

39. The device according to claim 34, wherein the second material is constant, and the first material is propelled towards the second material by means of a scotch yoke operatively connected to the last gear in the gear train such that the first material slides through the second material.

40. The device according to claim 26, wherein the power generation unit comprises a piezoelectric material.

41. The device according to claim 40, wherein the piezoelectric material is included as an array in a first gear in the gear train, and the other material is included as an array in a second gear adjacent to or in contact with the first gear.

42. The device according to claim 40, wherein piezoelectric materials are mounted on a fixed structure, and the other material is included as an array in the last gear, where the piezoelectric materials are stressed and released upon the motion of the gear train.

43. The device according to claim 40, wherein the piezoelectric material is fixed, and the other material is propelled towards the piezoelectric material by means of a slider-crank operatively connected to the last gear in the gear train so that the piezoelectric material is stressed and released upon the motion of the gear train.

44. The device according to claim 40, wherein the piezoelectric material is fixed, and the other material is propelled towards the piezoelectric material by means of a scotch-yoke operatively connected to the last gear in the gear train so that the piezoelectric material is stressed and released upon the motion of the gear train.

45. The device according to claim 26, wherein the power generation unit comprises a magnetostrictive material.

46. The device according to claim 45, wherein the magnetostrictive material is fixed, and the other material is propelled towards the magnetostrictive material by means of a slider-crank operatively connected to the last gear in the gear train such that the magnetostrictive material is stressed and released upon the motion of the gear train.

47. The device according to claim 45, wherein the magnetostrictive material is fixed, and the other material is propelled towards the magnetostrictive material by means of a scotch-yoke operatively connected to the last gear in the gear train such that the magnetostrictive material is stressed and released upon the motion of the gear train.

* * * * *